US012604086B2

(12) United States Patent
Angerer et al.

(10) Patent No.: US 12,604,086 B2
(45) Date of Patent: ***Apr. 14, 2026

(54) TELESCOPE WITH AT LEAST ONE VIEWING CHANNEL

(71) Applicant: Swarovski-Optik AG & Co KG., Absam (AT)

(72) Inventors: Bernhard Angerer, Mils (AT); Georg Blatnig, Innsbruck (AT); Matthias Daxner, Hall in Tirol (AT); Mario Dohr, Axams (AT); Klaus Gravogl, Vomp (AT); Stefan Jörer, Axams (AT); Thomas Salzburger, Stans (AT); Marco Seeber, Götzens (AT); Eva-Maria Sonnweber, Axams (AT); Sebastian Wachsmuth, Thaur (AT)

(73) Assignee: Swarovski-Optik AG & Co KG, Absam (AT)

( * ) Notice: Subject to any disclaimer, the term of this patent is extended or adjusted under 35 U.S.C. 154(b) by 66 days.

This patent is subject to a terminal disclaimer.

(21) Appl. No.: 18/466,807

(22) Filed: Sep. 13, 2023

(65) Prior Publication Data

US 2024/0259673 A1 Aug. 1, 2024

(30) Foreign Application Priority Data

Sep. 16, 2022 (AT) ............................... A 50716/2022

(51) Int. Cl.
| | |
|---|---|
| *H04N 23/63* | (2023.01) |
| *G02B 23/10* | (2006.01) |
| *G06V 10/25* | (2022.01) |
| *H04N 23/60* | (2023.01) |
| *H04N 23/667* | (2023.01) |

(52) U.S. Cl.
CPC ........... *H04N 23/635* (2023.01); *G02B 23/10* (2013.01); *G06V 10/25* (2022.01); *H04N 23/64* (2023.01); *H04N 23/667* (2023.01)

(58) Field of Classification Search
CPC .... H04N 23/635; H04N 23/667; H04N 23/64; G06V 10/25; G02B 23/10
See application file for complete search history.

(56) References Cited

U.S. PATENT DOCUMENTS

| | | | |
|---|---|---|---|
| 5,963,369 A | 10/1999 | Steinthal et al. | |
| 7,164,528 B2 | 1/2007 | Mogamiya | |
| 9,691,154 B2 | 6/2017 | Ernst et al. | |
| 11,573,427 B2 | 2/2023 | Müller | |
| 2002/0034004 A1 | 3/2002 | Khoshnevis et al. | |
| 2003/0063209 A1 | 4/2003 | Enomoto et al. | |
| 2003/0115215 A1* | 6/2003 | Swarovski | G06F 16/9537 |
| 2003/0231393 A1 | 12/2003 | Yamamoto et al. | |
| 2012/0098972 A1* | 4/2012 | Hansen | H04N 5/272 |
| | | | 348/E5.09 |
| 2012/0162775 A1 | 6/2012 | Francois et al. | |
| 2020/0049455 A1 | 2/2020 | Hamilton et al. | |
| 2023/0254578 A1 | 8/2023 | Watanabe et al. | |

FOREIGN PATENT DOCUMENTS

| | | | |
|---|---|---|---|
| DE | 102020106535 A1 | 9/2021 | |
| EP | 3037863 A1 | 6/2016 | |
| EP | 3833925 A1 | 6/2021 | |
| JP | 2009157283 A | 7/2009 | |
| WO | 2016157923 A1 | 10/2016 | |

* cited by examiner

*Primary Examiner* — Girumsew Wendmagegn
(74) *Attorney, Agent, or Firm* — Miller Nash LLP

(57) ABSTRACT

A telescope having at least one viewing channel comprises at least one camera.

10 Claims, 15 Drawing Sheets

TELESCOPE WITH AT LEAST ONE VIEWING CHANNEL

RELATED APPLICATIONS

This application claims priority under 35 U.S.C. § 119 (a)-(d) of Austrian Patent Application No. A50716/2022, filed Sep. 16, 2022.

TECHNICAL FIELD

The field of the present disclosure relates to a telescope with at least one viewing channel.

Furthermore, the field of the present disclosure relates to an observation and image capturing system.

SUMMARY

A need remains for a telescope with at least one viewing channel to overcome the shortcomings of the prior art and to provide a device by which use comfort and customer benefit can be increased.

A telescope of the initially mentioned type comprises at least one camera. An embodiment according to the present disclosure allows for a significant extension of the range of functions of the telescope.

Advantageously, the telescope comprises at least one display visible in the at least one viewing channel, in particular overlayed, particularly preferred reflected, in the at least one viewing channel. It is thus possible to display additional information for the user together with the image of a distant object generated by the telescope. This embodiment hence enables the user to enrich the generated image with data while viewing the distant object. According to a preferred variant, it may be provided that the telescope is configured to recognize objects in images captured by the camera. By means of the object recognition, it is possible to display information about the recognized objects for the user and to superimpose it on the image of the object. The recognition can be performed using artificial intelligence methods, for example by means of neural networks. It is further advantageous if the telescope is configured to generate a virtual marking frame and to represent it on the display, wherein it is further configured to recognize at least one object represented within the marking frame of the display. In this way, the representation of specific object-related information is facilitated. Thus, if a user desires additional information about an object, for example an animal, in particular a bird, the user can specifically capture the object with the telescope and have additional information displayed. The object recognition can be performed automatically or by the user performing an additional action, for example by actuating an actuator element, in particular a switch, or by the viewed object appearing within the marking frame for a predetermined time. An automatic object recognition can be performed, for example, by pre-selection and activation of this function by the user.

However, it is also possible to perform object recognition within the entire field of view of the camera and, in a first step of a multi-step procedure, to automatically identify the detected objects according to classes (for example, "bird" or "mammal"). In a further step, based on the first classification, a detailed identification can be performed.

To improve the accuracy of the recognition/classification, it is possible to include other data in the evaluation in addition to the analysis of the image content of the captured images. For example, it is advantageous to consider location information of the capturing site in the evaluation (e.g., by means of GPS), since this is associated with residence probabilities of the object to be recognized. It is also conceivable to measure the distance to the object in addition to the image capture. This can be performed using a separate or integrated rangefinder. From the distance to the object and the subjective object size (e.g. number of pixels in the image), the actual size of the object can be inferred. The object size determined in this way or also information about the date/time the image was taken or the current weather situation can also be taken into account as further parameters in the recognition. It can be particularly advantageous if the telescope has at least one memory with user-specific and/or topic-specific and/or location-specific information, in particular information on locally occurring animal species and/or field names and/or mountain names and/or POIs (points of interest) and/or that the telescope has a data interface for data exchange with at least one external memory with user-specific and/or topic-specific and/or location-specific information, in particular information on locally occurring animal species and/or field names and/or mountain names and/or POIs.

It has proven to be particularly advantageous if the telescope is configured to calculate, upon actuation of an actuator element based on a detected instantaneous movement of the telescope, an achievable image sharpness for an image to be captured with the camera and to indicate to the user whether the image can be taken with a required image sharpness and/or to indicate to the user whether the achievable image sharpness is suitable for automatic object recognition.

According to an advantageous variant, it may be provided that the telescope comprises at least one camera focusing lens and at least one focusing lens arranged in the viewing channel, wherein the telescope is configured to determine a relative position of an image center of a camera image relative to an image center of an image displayed in the at least one viewing channel based on a movement of the focusing lenses. In this context, it can be advantageous if the telescope is configured to correct a deviation of the image centers, for example by shifting the camera image in such a way that corresponding image sections of the camera image and of the image displayed in the viewing channel come to lie in the image center in both images.

It has also been found to be particularly advantageous that a field of view of the camera is larger than a field of view of the at least one viewing channel, wherein a field-side image section captured by an image capturing sensor of the camera is larger than a field-side image section captured by the at least one viewing channel. In this way, not only shifting of the image center of the camera image is facilitated, but also, for example, objects that are not directly visible in the viewing channel but are outside the field of view of the user looking through the viewing channel but are captured by the image sensor can be automatically recognized and, optionally, an indication of a recognized object can be superimposed into the viewing channel for the user.

Furthermore, it has proven particularly advantageous for the telescope to be configured to detect at least one change in orientation of the telescope.

Furthermore, the telescope may be configured to provide an object, which is imaged at a current position and orientation of the telescope, with a virtual marker and to store the virtual marker. This variation makes it possible to associate a particular object, for example a landscape marker, an animal, a mountain peak, a structure, etc., with a particular position and orientation of the telescope.

In this context, it has been found to be particularly advantageous if the telescope is configured to display at least one indication showing a user a direction in which the virtual marker is located in case of a change of an orientation of the telescope with respect to the position at which the virtual marker is set. This variant is particularly advantageous when the telescope is passed on by a first user to a second user, for example a second user standing next to him, since this enables the second user to find and view the marked object very easily.

Furthermore, the telescope may comprise a mode selection wheel, preferably arranged on a user-side end face of the telescope, for calling up at least one function of the telescope, wherein different functions are called up in different positions of the mode selection wheel. This variant makes it particularly easy to set different modes of the telescope. For example, the automatic image recognition can be selected by means of this mode selection wheel.

Furthermore, it has proven to be particularly advantageous that at least one position of the mode selection wheel can be assigned with a function that can be selected by a user. This gives the user the possibility of calling up preferred functions very quickly.

According to a further variant, the telescope may be a binocular with a first tube and with a second tube, wherein a first viewing channel extends through the first tube and a second viewing channel extends through the second tube, wherein the two tubes are connected to each other by a hinged bridge, wherein the two tubes are pivotable about a hinge axis of the hinged bridge to adjust an interpupillary distance, and wherein the camera has a camera beam path, wherein the hinge axis and an optical axis of the camera beam path are arranged coaxially to each other, and wherein a camera tube containing the camera beam path forms the hinge axis of the hinged bridge. This embodiment provides excellent viewing of objects and is comfortable and steady in the hand.

Furthermore, it may be provided that a beam path through an objective, a focusing lens, an erecting system and an eyepiece is formed in each one of the viewing channels. Also, the camera beam path may be formed in the camera tube by a camera objective, second camera focusing lens and a camera eyepiece, as well as an image capturing sensor, wherein the camera eyepiece is arranged between the camera focusing lens and the image sensor. Furthermore, the focusing lenses of the viewing channels and the camera focusing lens may be movable together by means of a focusing device. In this context, "lens" can be understood to mean both a single lens and a lens system consisting of multiple lenses.

It has been found to be particularly advantageous that a first joint part of the first tube and a second joint part of the second tube are arranged to abut against a lateral surface of the camera tube.

It is particularly preferred for the camera tube to be formed with a spring arrangement for generating a pivot resistance between the first joint part of the first tube and second joint part of the second tube.

It has been found to be particularly advantageous that the spring arrangement is arranged around the camera beam path and, in particular, comprises at least one wave spring. This variant is characterized by the fact that, despite the spring arrangement, the construction length of the camera channel and thus of the entire device can be kept very small.

Furthermore, it has proven to be particularly advantageous that the at least one spring arrangement has at least one opening through which a rod for moving a focusing lens of the camera beam path runs. By this advancement, a particularly space-saving arrangement for actuating the focusing lens of the camera can be realized without impairing the clamping and holding function performed by the spring arrangement.

Furthermore, it may be provided that the camera tube is fixedly connected to one of the two tubes and that the camera tube and the tube connected thereto can only be pivoted together relative to the other tube. The display may be arranged in at least one of the two tubes, preferably in the first tube fixedly connected to the camera tube. Furthermore, a display may also be arranged in both viewing channel tubes.

Camera is to be understood as the combination of an objective with an imaging sensor and evaluation electronics, which can convert an image of electromagnetic radiation (e.g. in the UV, visible or IR spectral range) through the objective onto a two-dimensional sensor (e.g. CCD, CMOS, microbolometer) into electrical image information. It is particularly advantageous if the telescope is configured to detect a pivot angle when adjusting an interpupillary distance by pivoting the first and second tubes against each other, and to perform a position correction of information shown on the display based on the detected pivot angle.

Furthermore, the telescope may have a focusing knob for setting a focus, preferably a center of gravity of the telescope may be located in the area of the focusing knob.

The above-mentioned object is also achieved with an observation and image capturing system in that it comprises at least one telescope according to the present disclosure and at least one electronic terminal, wherein the at least one telescope and the at least one electronic terminal are coupled to one another via a connection at least temporarily.

It has proven to be particularly advantageous that the observation and image capturing system has at least one application program which can be transferred from a server to the telescope by means of the terminal, and/or that the application program, when installed on the telescope, can be accessed and/or executed by means of the terminal.

According to an advantageous further development, it can be provided that functions or parameters of the application program can be changed via an access by means of the terminal to the at least one application program.

Furthermore, it is preferred that the telescope is configured to show different information on the display depending on the selection of the functions and parameters.

BRIEF DESCRIPTION OF THE DRAWINGS

For the purpose of better understanding of the invention, it will be elucidated in more detail by means of embodiments described with reference to the figures below.

These show in a respectively very simplified schematic representation.

DETAILED DESCRIPTION OF EXEMPLARY EMBODIMENTS

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Figure 1:
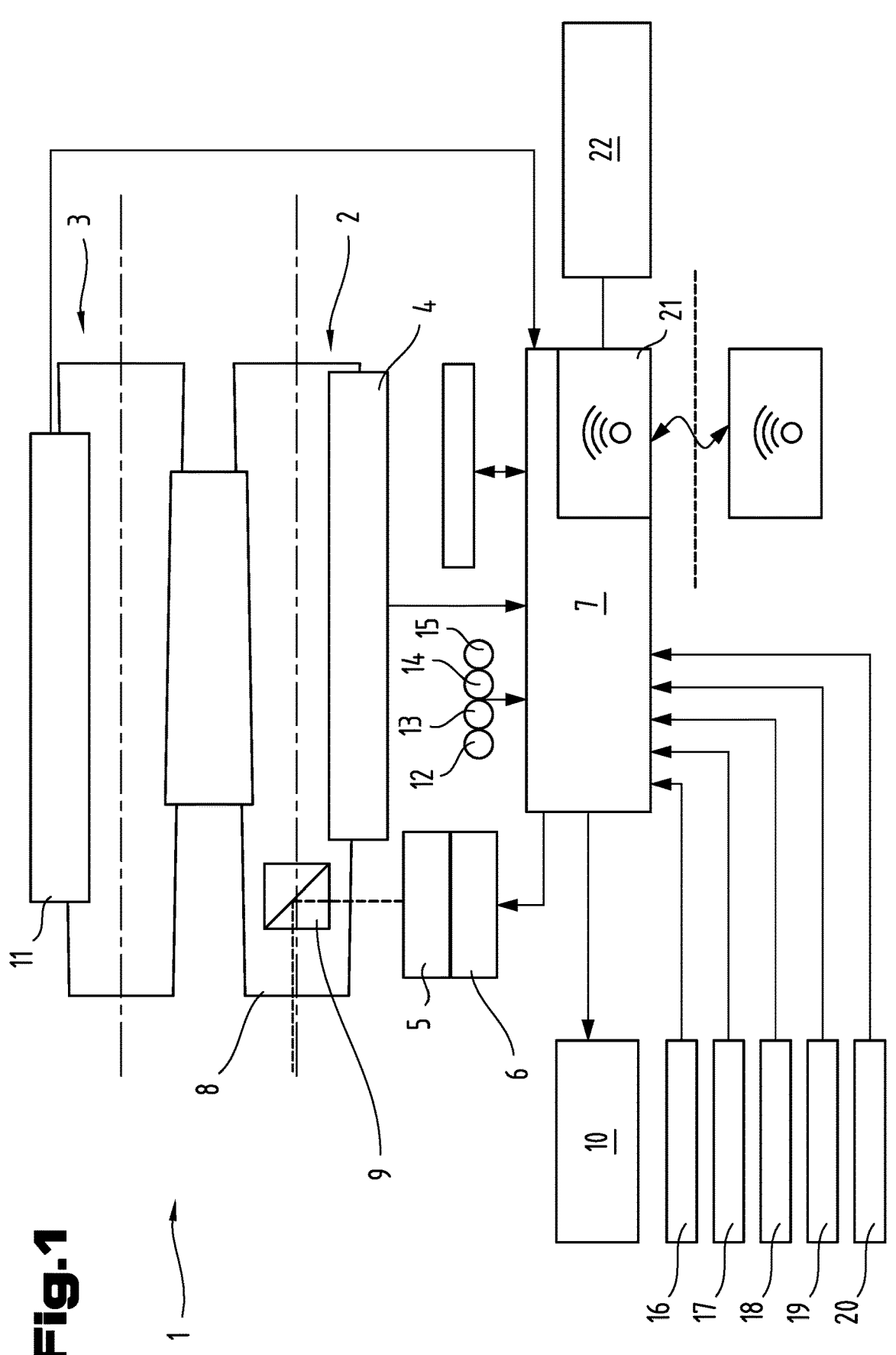
FIG. 1 a block diagram of a telescope according to an embodiment.

According to FIG. 1, a telescope 1 according to one embodiment has one viewing channel 2 or two viewing channels 2 and 3 as well as at least one camera 4. The telescope 1 has a display 5 which is visible in the viewing channel 2, in particular is overlayed, particularly preferred reflected, in the one viewing channel 2. In the event that the telescope 1 has two viewing channels 2, 3, it may be provided that a display is displayed in each of the viewing channels 2, 3. It is particularly preferred for the display 5 to be an LCoS display (LCoS=Liquid Crystal on Silicon).

The display 5 can be controlled by a controller 7 of the telescope 1 via a display driver 6. The controller 7 is preferably a programmable circuit, for example in the form of a processor, in particular a microprocessor or signal processor. In the embodiment shown, the information shown on the display 5 is reflected into the viewing channel 2.

Figure 20:
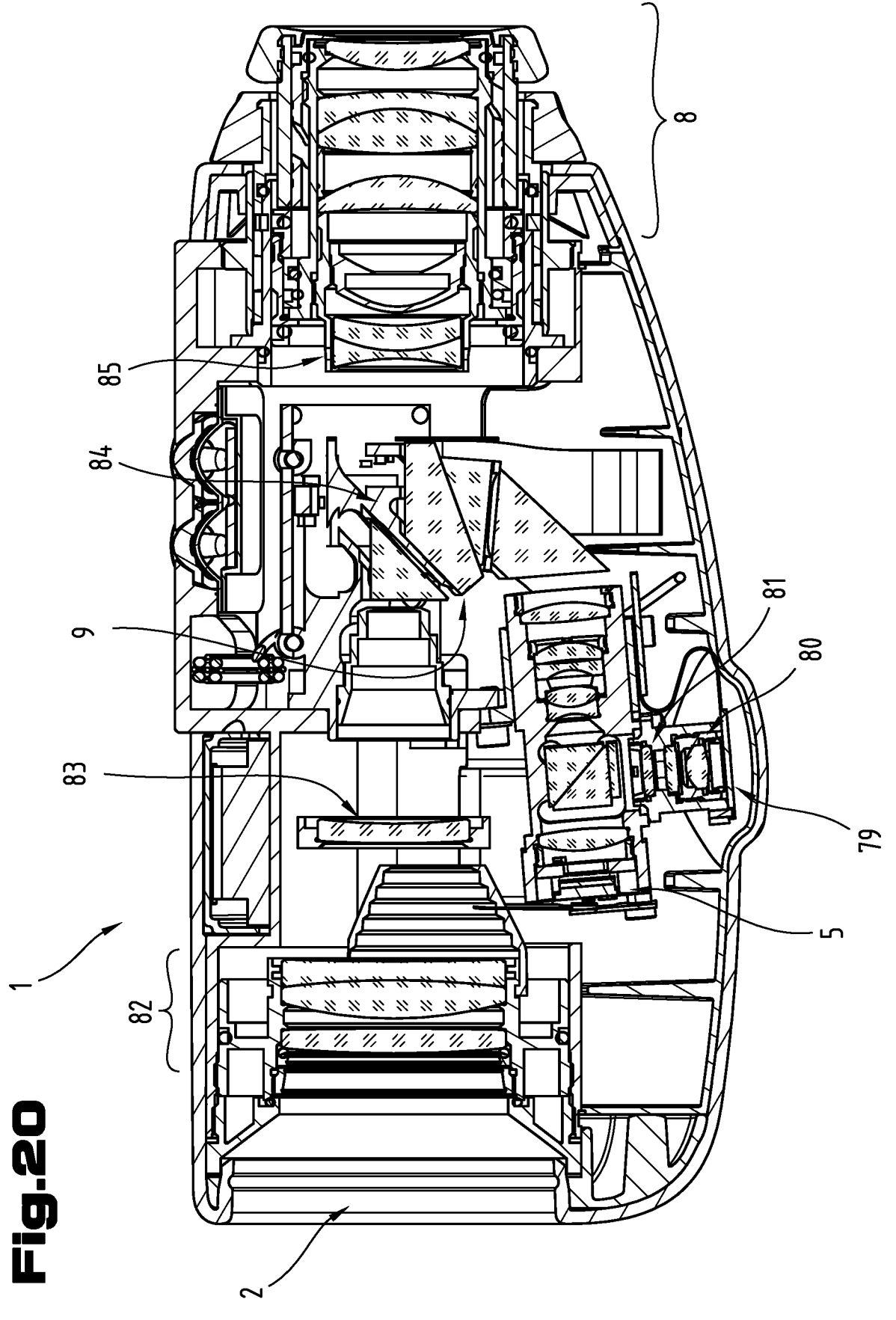
FIG. 20 a longitudinal section of the viewing channel of the telescope of FIG. 12 together with the beam path of an LCOS display forming the display.

A specific constructive embodiment of such a beam path of the viewing channel 2, with which a beam path of the display 5 is coupled for reflecting the visual display, is shown in FIG. 20. In this regard, FIG. 20 shows a longitudinal section of the viewing channel 2 of the telescope 1 together with the beam path of an LCOS display forming the display 5.

In this regard, the light from an LED 79 used for illumination is collimated by a condenser 80 and falls on a lens array 81. Each individual lens of this array produces a (reduced) intermediate image of the LED on a relatively large area independent of the LED size. Each of these images illuminates the complete display 5 in each case. In doing so, the outline of the individual lenses is precisely displayed onto the display 5, thus defining the illuminated area. The display 5 and/or the visual display generated on it is coupled into the viewing channel 2 at the reflecting surface on the display prism 9 and thus displayed in its image plane. In this exemplary embodiment, a Schmidt-Pechan prism system with additional prisms for display reflecting is provided for this purpose. At the location of the exit pupil (AP) of the viewing optics of the viewing channel 2, the individual LED images form a (relatively large) area in which the display 5 is visible. A large AP, so to speak.

A user, looking through an eyepiece 8 of the viewing channel 2, sees the overlay of an image of a distant object and a visual display generated by the display 5. In the shown embodiment, the visual display of the display 5 enters a beam path of the viewing channel 2 via a display prism 9 (FIG. 20) and then enters the eye of a user. In this case, the light rays coming from the display 5 can be deflected by 90° by reflection at a diagonally extending boundary surface of the display prism 9 formed as a beam splitter cube, and thus be guided in the direction of the eyepiece 8 and into the beam path of the viewing channel 2.

The display 5 may be illuminated by an illumination device. The illumination device may include a light source whose light is directed toward the display 5, where it may first be focused/collimated by an illumination lens and polarized by a polarizer. Liquid crystal molecules of the display 5 can be aligned by electrical voltage such that the light is reflected at the desired brightness. The alignment of the liquid crystal molecules required to produce an image on the display 5 is effected by the controller 7.

For reasons of clarity, the optical components of the viewing channels 2, 3 and of a camera channel comprising the camera 4 are not shown in further detail in FIG. 1. However, a possible structure is briefly described here. Both the viewing channel 2 and the camera channel, or just the camera channel alone, can have a cover glass on the object side. The viewing channel 2 has an objective lens 82, a focusing lens 83, an erecting system 84 formed by prisms, a field lens 85, and the eyepiece lens 8. A first beam path for enlarged representation of a distant object is formed in the viewing channel 2 by the mentioned optical elements. A second beam path is formed in the camera channel. Following the cover glass 74, its optical elements comprise an objective lens 75, a focusing lens 76, an eyepiece lens 77 (FIG. 17), and a camera module 78 and/or the camera 4. The objective lens 75, focusing lens 76, and the eyepiece lens 77 of the camera channel may together form an afocal lens system. The camera module and/or the camera 4 is preferably formed as a unit with an electronic image capturing sensor, a separate objective and with an integrated autofocus function. If the telescope 1 has a second viewing channel 3, it may have the same optical structure as the viewing channel 2.

Furthermore, the telescope 1 may have a display unit 10 and/or a plurality of illuminatable display segments, for example for displaying a charging state of an energy storage 11 of the telescope 1. By means of a color-variable illumination unit, the display unit 10 can be illuminated in different colors, wherein different operating states of the long-range optical device 0 can be visualized.

For example, a readiness for operation and/or a switching on of the telescope 1 can be signaled by means of an illumination of the display unit 10 in a first color.

One or more electronic operating elements 12, 13, 14, 15, for example operating buttons, may be provided for performing actions, for example confirming entries, scrolling forwards and backwards in a menu shown on the display 5, etc.

Figure 17:
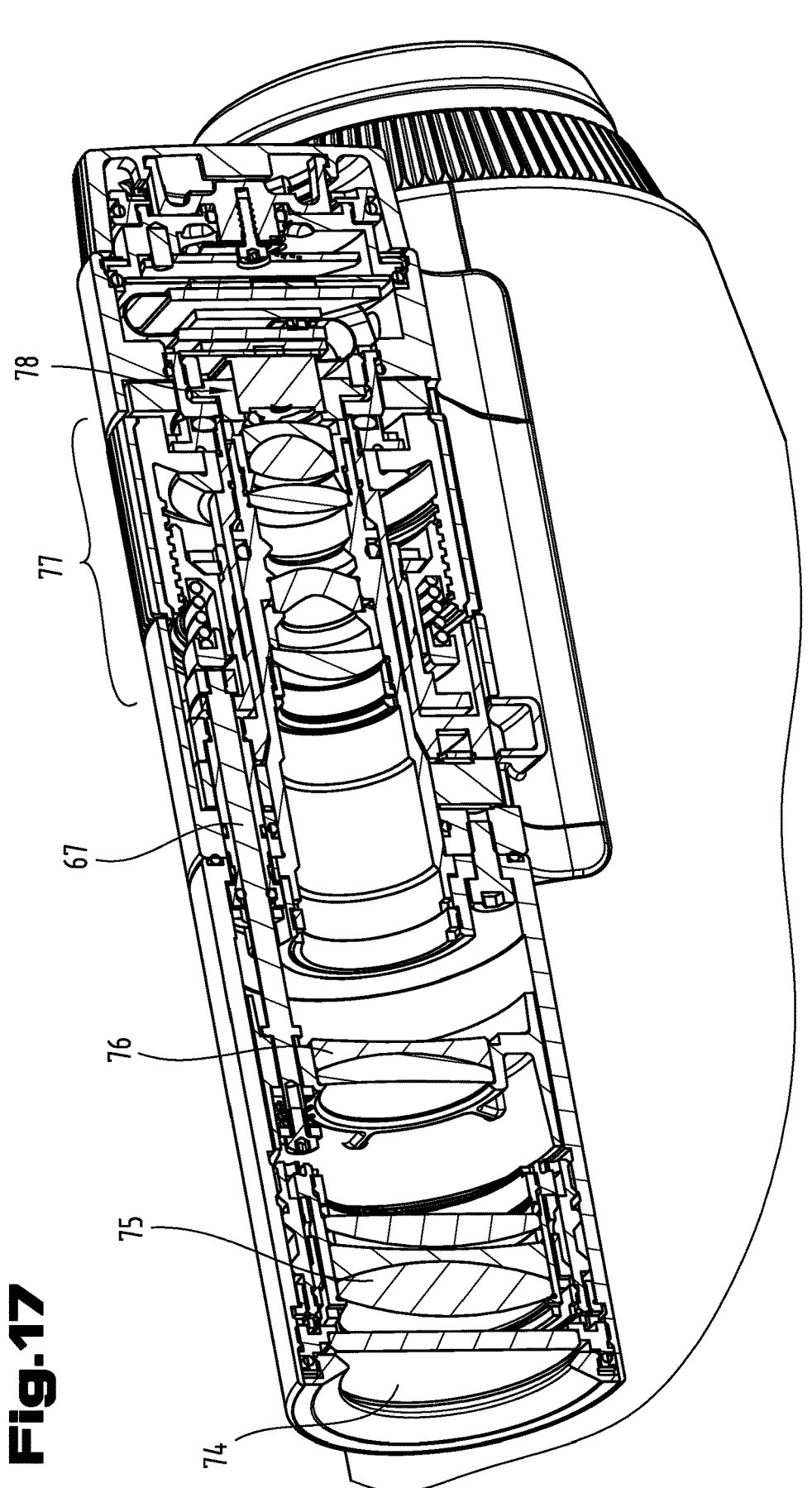
FIG. 17 a section along line A-A in FIG. 13.

Furthermore, the telescope may comprise multiple sensors 16, 17, 18, 19, 20, such as a geoposition acquisition sensor 16, in particular a GPS, GLONASS, Galileo or BeiDou receiver. Furthermore, it has proven to be particularly advantageous if the telescope also has a brightness sensor 17, an electronic compass 18, a tilt and/or gyro sensor 19, for example a gyroscope, and a sensor 20 for detecting a linear movement of the focus lenses 76, 83 (FIGS. 17, 20).

Figure 12:
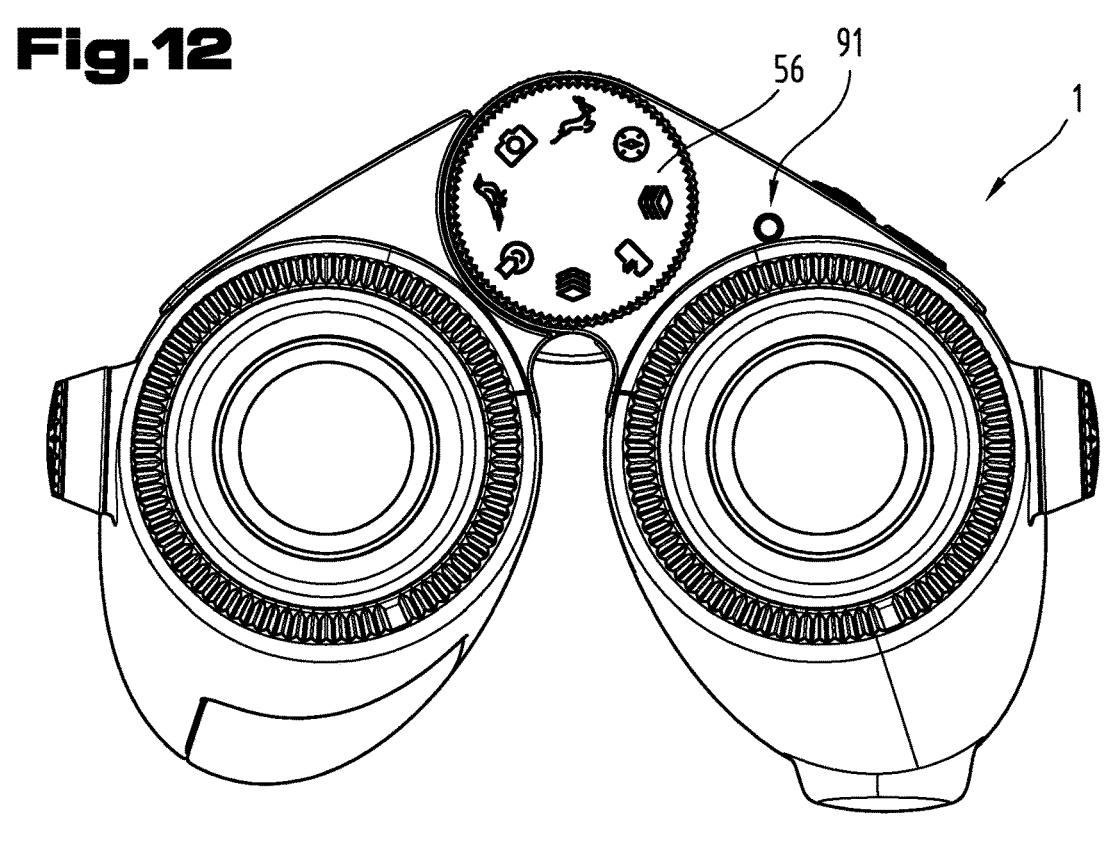
FIG. 12 a perspective view of a telescope according to an embodiment.
Figure 21:
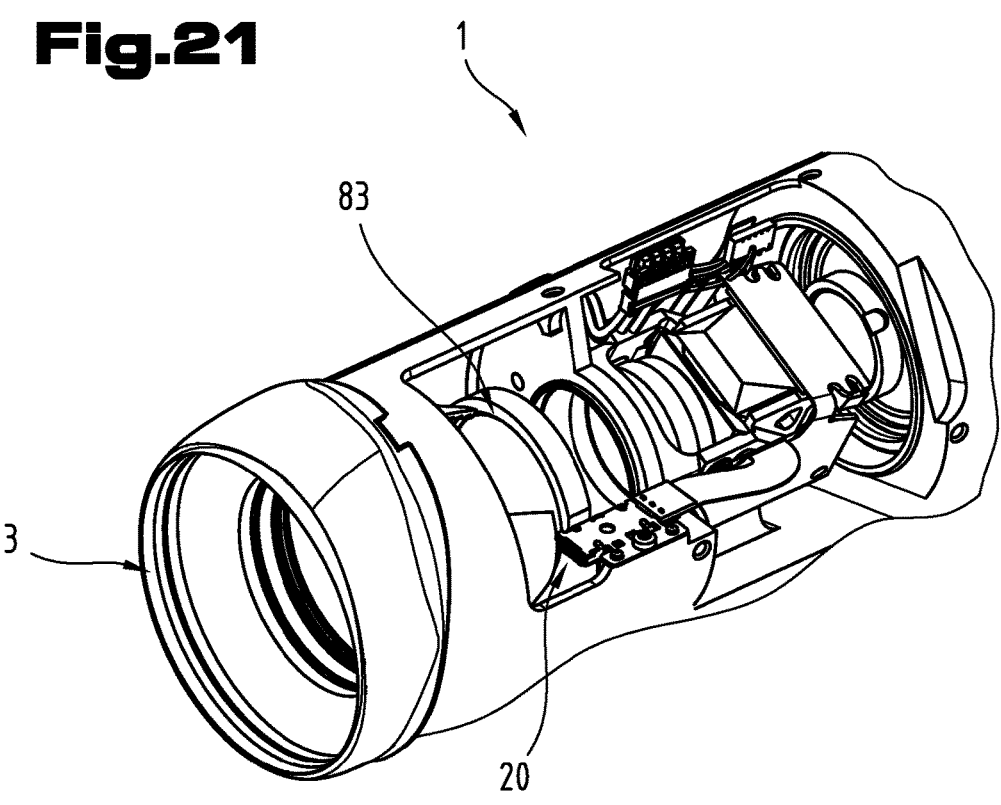
FIG. 21 a detail of the viewing channel of the telescope according to the embodiment according to FIG. 12, partially cut and shown in perspective.

FIG. 21 shows a detail of the viewing channel 3 of the telescope 1 according to the exemplary embodiment according to FIG. 12, partially cut and shown in perspective. The sensor 20 can detect an amount of movement of the focusing lens 83. The sensor 20 formed by a linear sensor is soldered on a circuit board. On the one hand, it is aligned with the housing of the viewing channel 2 via two dowel pins and secured to the housing by a screw. On the other hand, a plunger of the linear sensor engages a groove of the socket of the focusing lens 83 and is carried along with it during the focusing movement. The relative movement can be read electronically from the sensor 20. For this purpose, the sensor 20 is formed by a linear sliding potentiometer. Depending on the position of the focusing lens 83—and thus the position of the plunger of the sensor 20—a specific resistance results in the potentiometer, which is read out and digitized by an electronic circuit. When the telescope 1 is manufactured, appropriate calibration is required when it is installed in the instrument.

Figure 3:
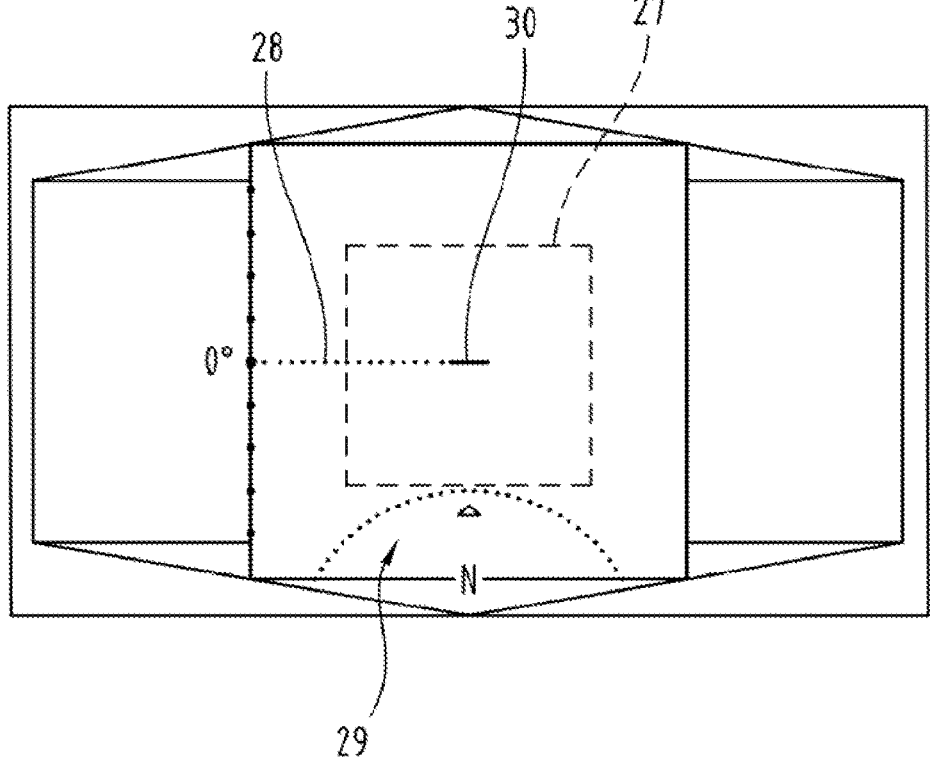
FIG. 3 a second visual display on a display of the telescope of FIG. 1.

For very distant objects, the beam paths of the camera channel and viewing channel 2 and/or viewing channels 2, 3 are approximately parallel, so that the center of the camera image corresponds to the center 30 of the image of the viewing channel 2, 3 when focusing on a distant object (FIG. 3). However, when viewing an object located at a shorter distance, there is a difference in the positions of the image centers between the viewing channel 2 and the camera channel. To illustrate this, FIG. 22 contrasts the two situations, an object located at infinity (left representation) and, on the other hand, the object located at close range (right representation).

Figure 22:
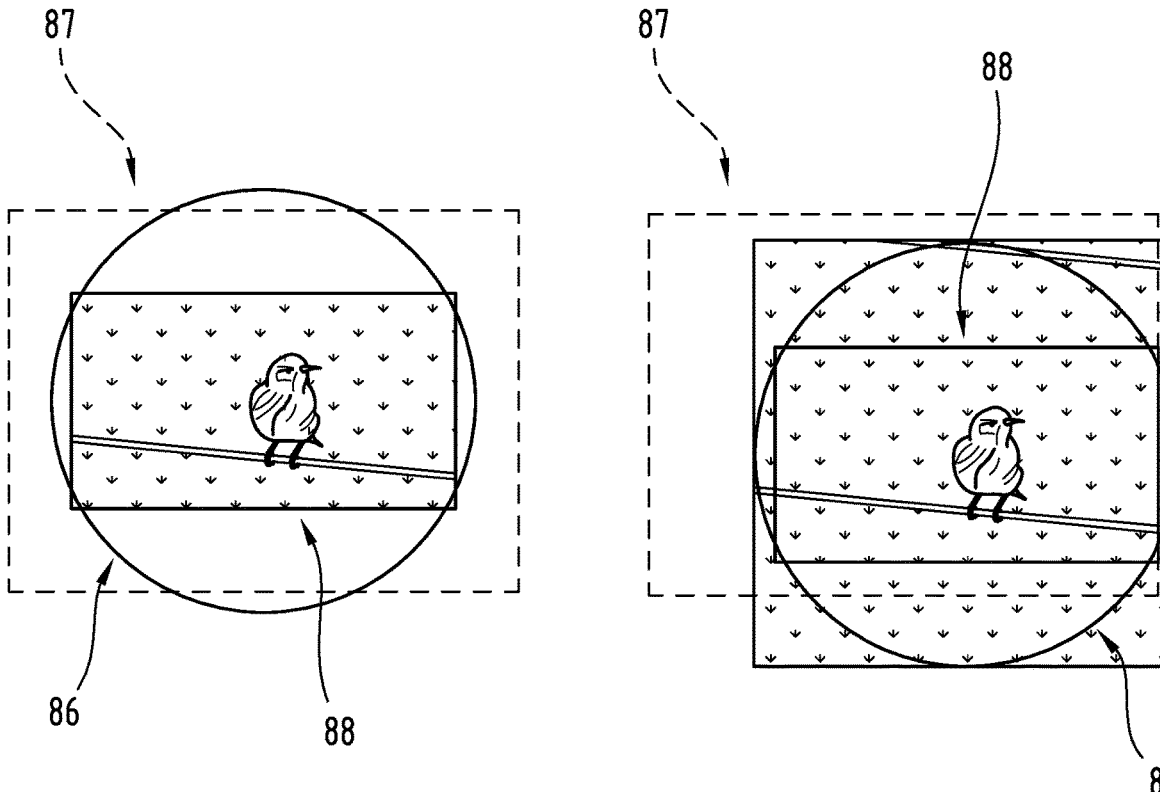
FIG. 22 comparison of two images of the field of view as they appear to a user.

FIG. 22 shows two images of the field of view as they appear to a user looking through the viewing channels 2 of the telescope 1. On the one hand, an edge of the field of view 86 of the viewing channel 2 indicated by a circle and, on the other hand, an edge of the field of view 87 of the image capturing sensor of the camera 4, is overlayed on these images. In contrast to the situation "object at infinity" (left representation), the situation "object at close range" (right representation) shows a movement of the field of view 87 of the image acquisition sensor relative to the field of view 86 of the viewing channel 2. In addition, an edge 88 of the display 5 is also shown. This deviation increases the closer the observed object is located and is caused by the structure-related offset of the two channels from each other (parallax). The corresponding deviation of the image centers leads to application errors when, for example, images are centered and captured using superimposed markers. Likewise, a correction is necessary for an autofocus limited to a certain image area or for an exposure correction or for applications which superimpose or assign object-related information to the viewed image by display in the viewing channel 2, 3. For this reason, it is advantageous if the telescope 1 is configured to determine a relative position of an image center of a camera image relative to the image center 30 of an image displayed in the at least one viewing channel 2 on the basis of a movement of the focusing lenses 83, 76 (FIG. 17, 20, 21) and to correct an image center deviation (parallax correction). Based on the position of the focusing lenses 83, 76, it is in fact quite easy to infer the distance of the object, which is observed and on which focus is set, from the telescope 1 and to calculate the parallax-caused movement therefrom. Depending on the position of the focusing lenses, a region of the camera image can thus be shifted to such an extent that the image center of the shifted camera region again corresponds to the image center of the image in the viewing channel 2, 3. It is advantageous in this regard that the focusing lenses of the viewing channel 2, 3 and the camera channel are coupled to each other and can only be shifted together.

Moreover, the telescope 1 may have at least one interface 21 for data transmission to an external device, in particular a mobile radio device or to a second telescope 1. Preferably, the interface 21 is an interface for wireless data transmission. However, the telescope 1 may also have a data interface for wired data exchange, for example a USB interface. Furthermore, the telescope 1 may have a WLAN module and/or a mobile radio module, for example a GSM module, and/or a Bluetooth module or an NFC module. Via a wireless connection of the long-range optical device 0 with an electronic terminal, parameters and/or functions can be transmitted from the electronic terminal to the long-range optical device 0 and vice versa.

Furthermore, the telescope 1 may comprise one or more memories 22 which can be accessed by the controller 7. For example, images may be stored in a sub-area of this memory 22, while application programs may be stored in other sub-areas, which may be loaded into a working memory of the controller 7 as required. Also, sub-areas of the memory 22 may contain data recorded by the sensors 16, 17, 18, 19, 20.

Furthermore, user- and/or topic- and/or location-specific information, in particular information on locally occurring animal species and/or field designation and/or mountain names and/or POIs can be stored in the memory 22. Alternatively or in addition to storing the information just mentioned in the internal memory 22, however, it may also be provided that the telescope 1 retrieves this information from an external memory, for example a server, via a data connection, for example a wireless data connection, by means of the interface 21.

Furthermore, the telescope 1 may be configured to recognize objects in images captured by the camera 4. For this purpose, a corresponding image recognition program may be executed by the controller 7. For example, data stored in the memory 22 can be used to determine which object is involved.

Figure 2:
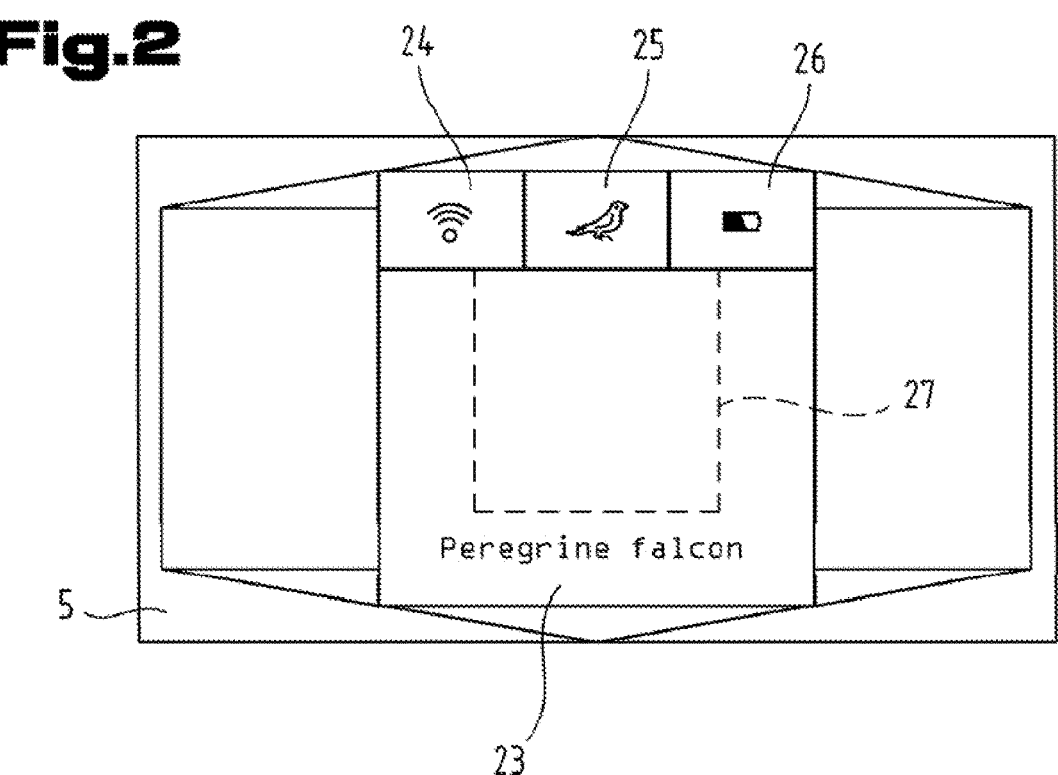
FIG. 2 a first visual display on a display of the telescope of FIG. 1.

The controller 7 controls the visual display of the information shown on the display 5. Thus, as shown in FIG. 2, as soon as an object is detected, the designation 23 of this object can be displayed on the display 5. Furthermore, icons 24, 25, 26 for currently activated settings or status displays can also be shown.

As can be further seen from FIG. 2, only an edge region of the display 5 is used to show additional information in order to allow the user to observe as unimpaired as possible. In FIG. 2, a border 27 of this edge region of the display 5 is only indicated by a dashed frame. The telescope 1 is configured such that as soon as an object is located within this inner border 27 of the display 5, an image recognition can be triggered. This is effected, for example, by actuating one of the operating elements 12 to 15. Alternatively, of course, image recognition can also be triggered automatically as soon as an object is located within the border 27.

The information shown on the display 5 can depend on the currently selected and executed function of the telescope 1.

For example, as shown in FIG. 3, in a particular mode, information 28 relating to the inclination of the telescope and compass data 29 may be shown on the display 5 and overlayed on the image of the object being observed.

Figure 4:
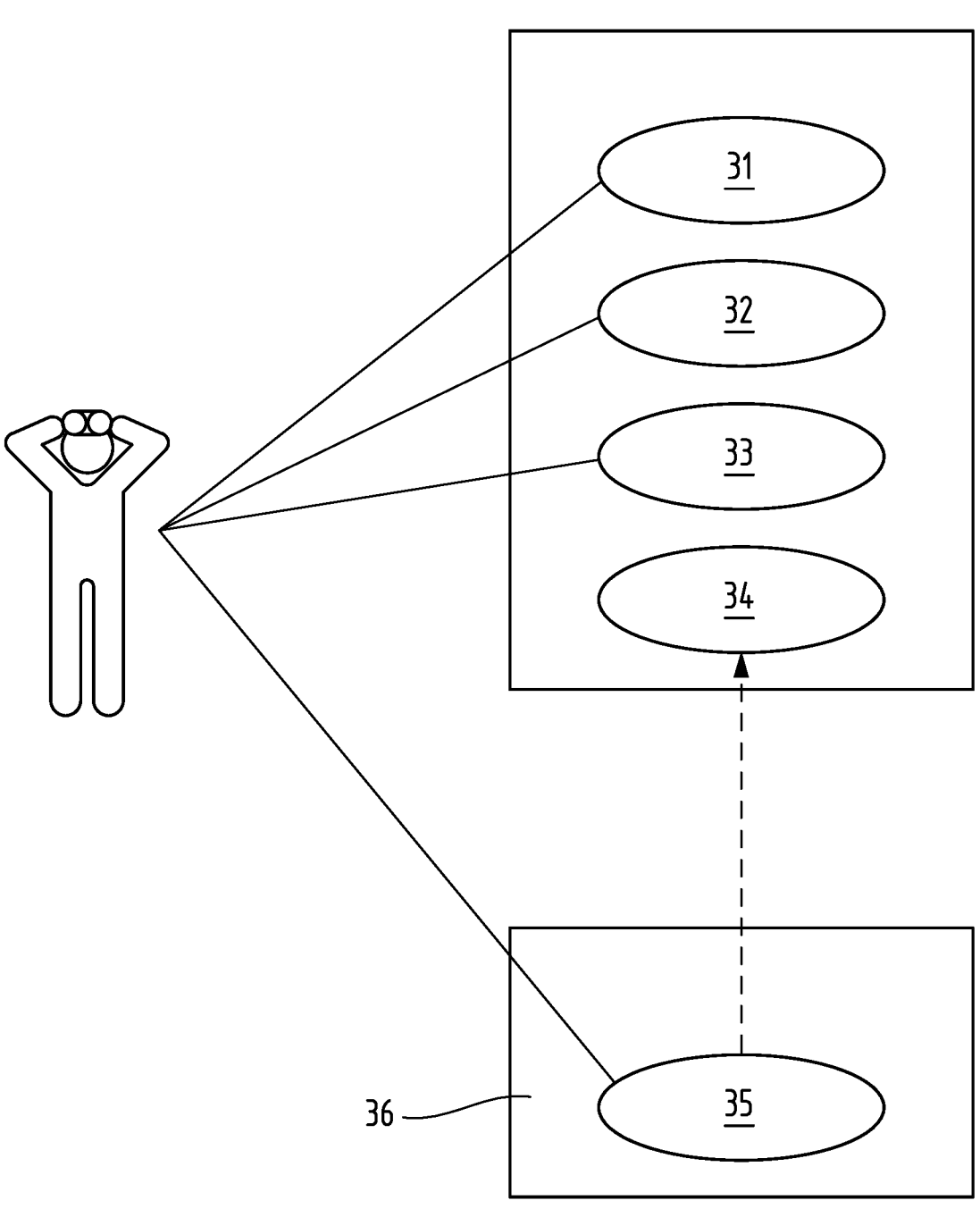
FIG. 4 a sequence of a use of the telescope of FIG. 1.

As shown in FIG. 4, the user has the possibility to access and change various settings directly on the telescope 1. For example, in a menu shown to them on the display 5 (FIG. 2), they can call up a menu item 31 for using an orientation support. In a menu item 32, for example, they can select to change the compass settings. In an item 33, they can select or activate the calibration of the electronic compass. The input of a declination can be selected for example again in an item 34. Advantageously, the declination is entered via a corresponding input field 35 of a smartphone 36 coupled to the telescope 1. The use of the smartphone 36 is advantageous in that it facilitates the input of more complex character strings.

Figure 5:
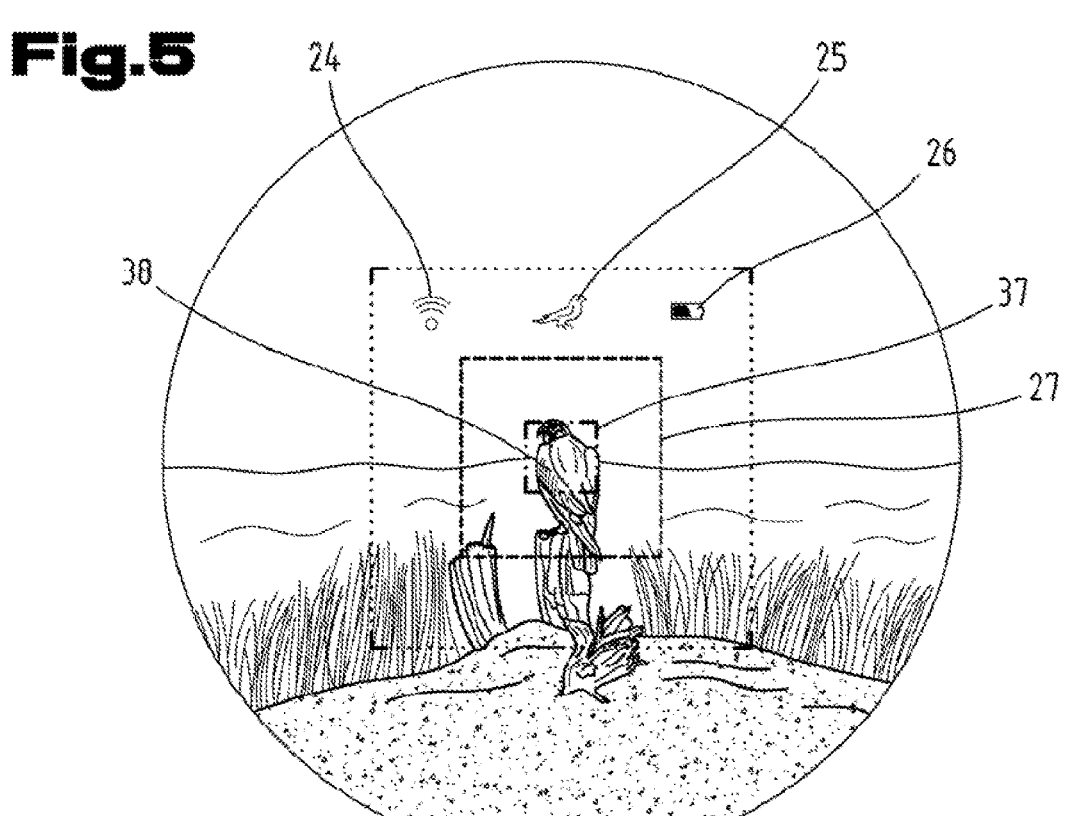
FIG. 5 an overlay of a visual display on a display with an image of an observed object.
Figure 6:
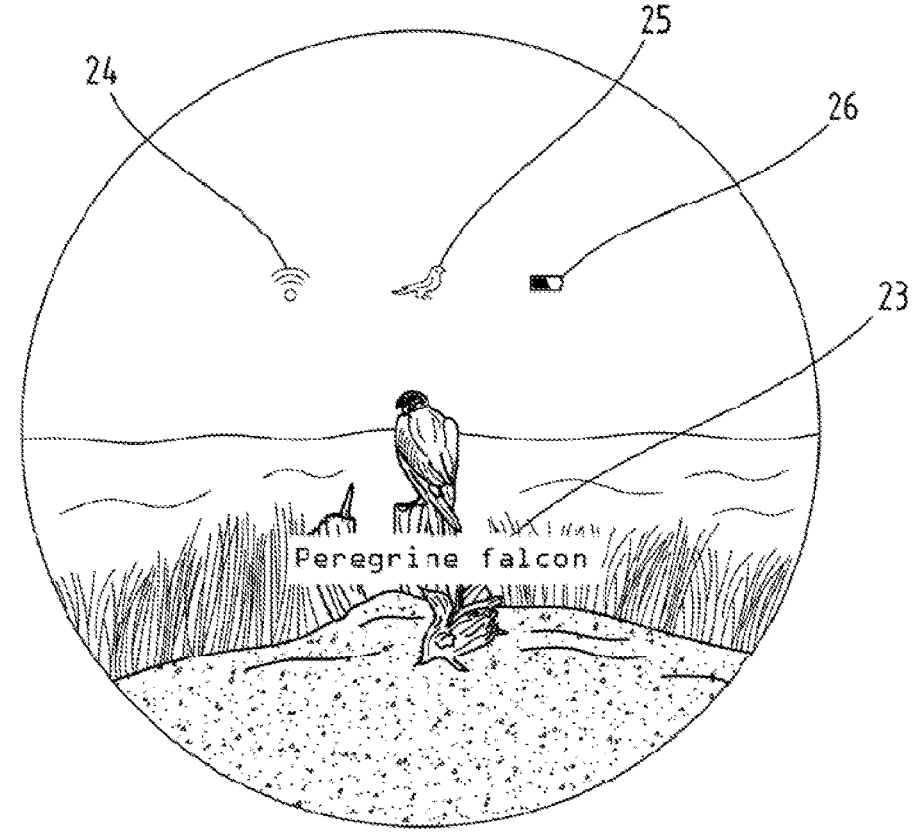
FIG. 6 a further overlay of a visual display on a display with an image of an observed object.

FIGS. 5 and 6 show an example of the capturing and recognition of an object 38, in the form of a hawk, lying partially within a frame 37 arranged within the border 27. The icon 24 displayed above the object 38 indicates to the user that the wireless connection function (WLAN, Bluetooth, etc.) is activated. The icon 25, in the form of a bird, means that a bird recognition mode is currently active. A charging level of the energy storage 11 is indicated by the icon 26.

The border 27 and the frame 37 make it easier for the user to move the telescope 1 so that the object 38 comes to rest in a center of the image. By actuating an actuator element, for example one of the actuator elements 12-15, in particular in the form of a button, the user can activate different functions.

Which function is performed can depend on the duration of actuation and the force with which the actuator element is actuated. For example, when the actuator element is pressed lightly, the frame 37 can be displayed. Then, when the pressure is intensified, a photograph may be taken, for example. Or, when pressed twice, a video recording can be started. Another possibility would be that an object recognition is triggered depending on the pressure and duration of the actuator element.

To determine an actuating period, the actuator element can have a first measuring device, wherein a first function can be executed for a first actuating period, and a second function that differs from the first function can be executed for a second actuating period that differs from the first actuating period.

For determining a time interval between the actuations of the actuator element, the actuator element comprises a measuring device, wherein a first function can be executed for a first actuating period, at least one first time interval and at least one second actuating period, and a second function different from the first function can be executed for a third actuating period, at least one second time interval and at least one fourth actuating period.

For determining an actuating force, the actuator element comprises a further measuring device, wherein a first function can be executed in the case of a first actuating force and a second function different from the first function can be executed in the case of a second actuating force different from the first actuating force.

As soon as the object 38 or a part of the object 38 essential for the recognition is in the optimal position for an object recognition within the frame 37, the object recognition is performed, triggered by the user or automatically in case of an appropriate presetting.

FIG. 6 shows what the user sees when looking through the eyepiece through the viewing channel 2, 3 after object recognition has been performed. Below the object 38, the designation 23 of the bird is displayed, while above the object a status bar with the icons 24, 25, 26 is displayed.

Figure 7:
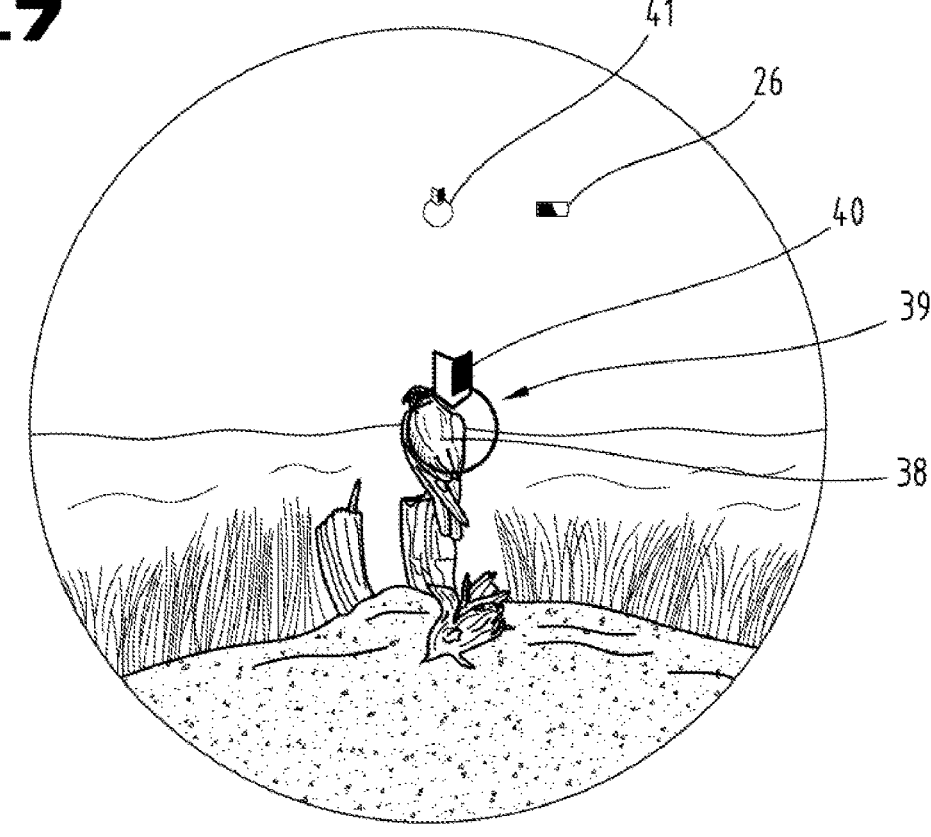
FIG. 7 a further overlay of a visual display on a display with an image of an observed object.
Figure 8:
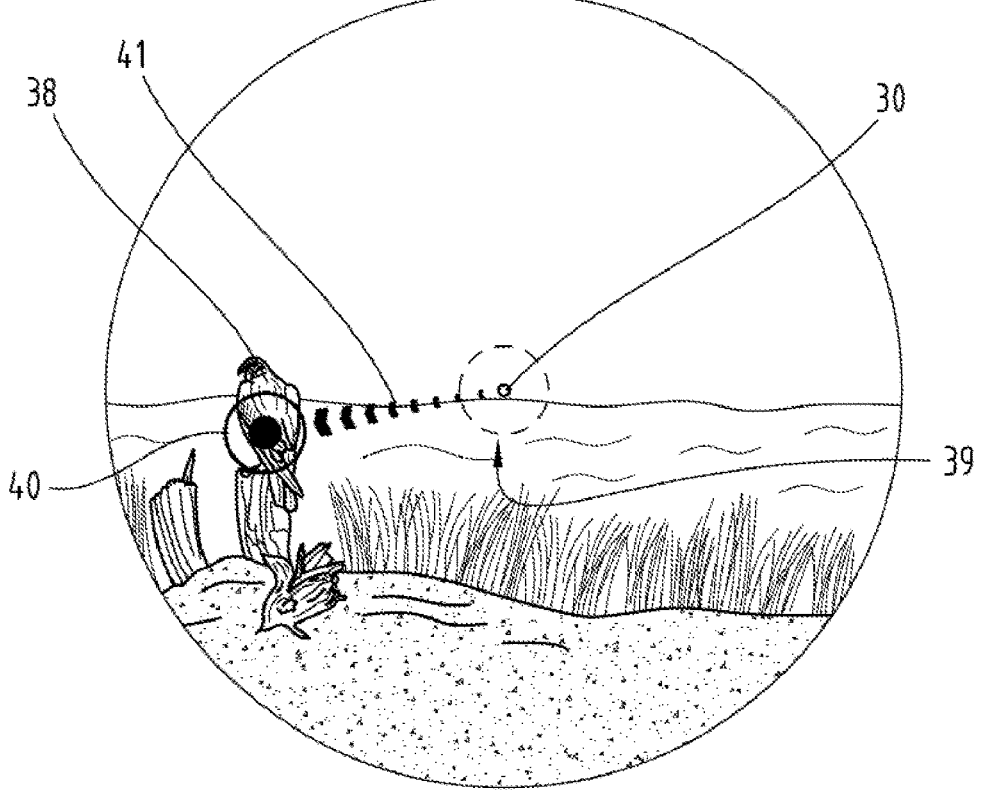
FIG. 8 a further overlay of a visual display on a display with an image of an observed object.

FIG. 7 and FIG. 8 show an embodiment in which the object 38, which lies partially within a region 39 around the image center 30, is provided with a virtual marker 40. In this regard, the spatial orientation of the telescope 1 in a current position in which it displays the object 38 is captured and stored. The virtual marker 40 can thus be assigned a specific location (orientation and position) of the telescope 1. If the marked object 38 is located outside the image center 30 and/or region 39, in particular outside the field of view of the observer, the distance between virtual marker 40 and image center 30 can be indicated by means of indicator elements 41, in particular in the form of arrows.

In this regard, the determination of the current alignment of the telescope is performed via sensors built into the telescope, which are suitable for determining the current orientation and inclination of the optical axis of a viewing channel, in particular the viewing channel with the overlayed display. This can be done, for example, via an electronic compass and an inclinometer. Typically, however, customary electronic compasses have inaccuracies in the range of +5-10° and can therefore only be used to a limited extent. Better suited are combined sensors for relative alignment measurement, which provide much more accurate results from a fusion of multiple different sensor units, for example from the fusion of a three-axis gyro sensor with a three-axis acceleration sensor.

Figure 9:
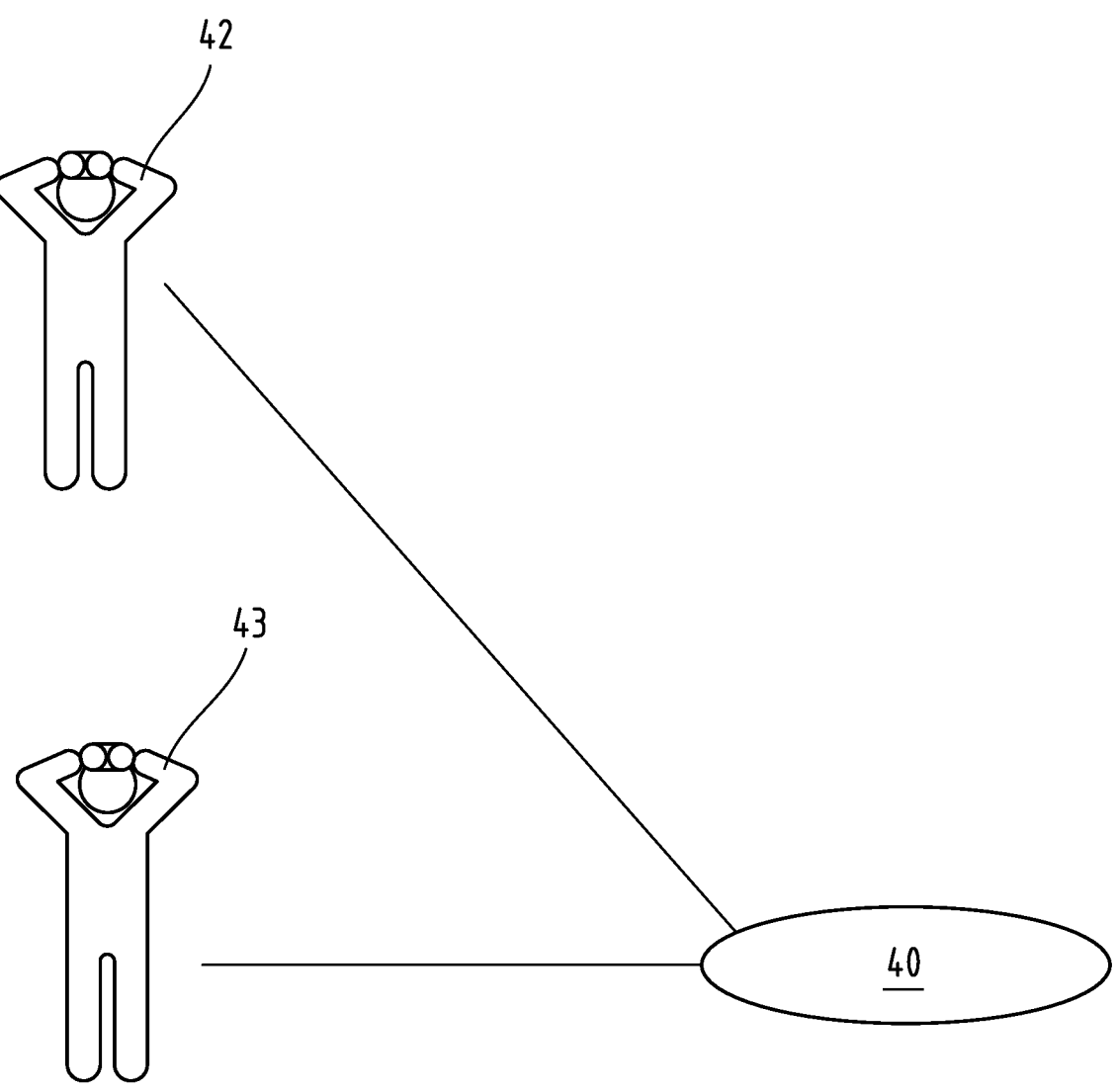
FIG. 9 a sequence of a use of the telescope of FIG. 1.

However, setting the virtual marker 40 and displaying indicator elements 41 that refer to the virtual marker 40 also makes it possible, when the telescope 1 is passed from a user 42 to another user 43, such as a person standing next to the user, for that person to be easily directed to the virtual marker 40 (FIG. 9). The object 38 can be found very quickly by the person to whom the telescope 1 has been passed by indication of a direction in which the virtual marker is located.

The fact that the telescope 1 is in a mode in which setting the virtual marker 40 is possible is indicated to the user in FIG. 8 by the icon 41 in the overlayed status bar.

Furthermore, a field of view of the camera 4 and/or the camera channel may be larger than a field of view of the viewing channel 2, 3. A field-side image section captured by the image capturing sensor of the camera 4 is larger than a field-side image section captured by the viewing channel 2, 3. On the one hand, this makes it possible to shift the image center of the camera image as part of the image center correction already mentioned, and on the other hand, it makes it possible to capture details or objects that are outside the observer's field of view when looking through the viewing channel 2, 3. This opens up the possibility of displaying an appropriate indication to the observer when an object of interest is recognized outside their field of view by means of automatic object recognition.

Figure 10:
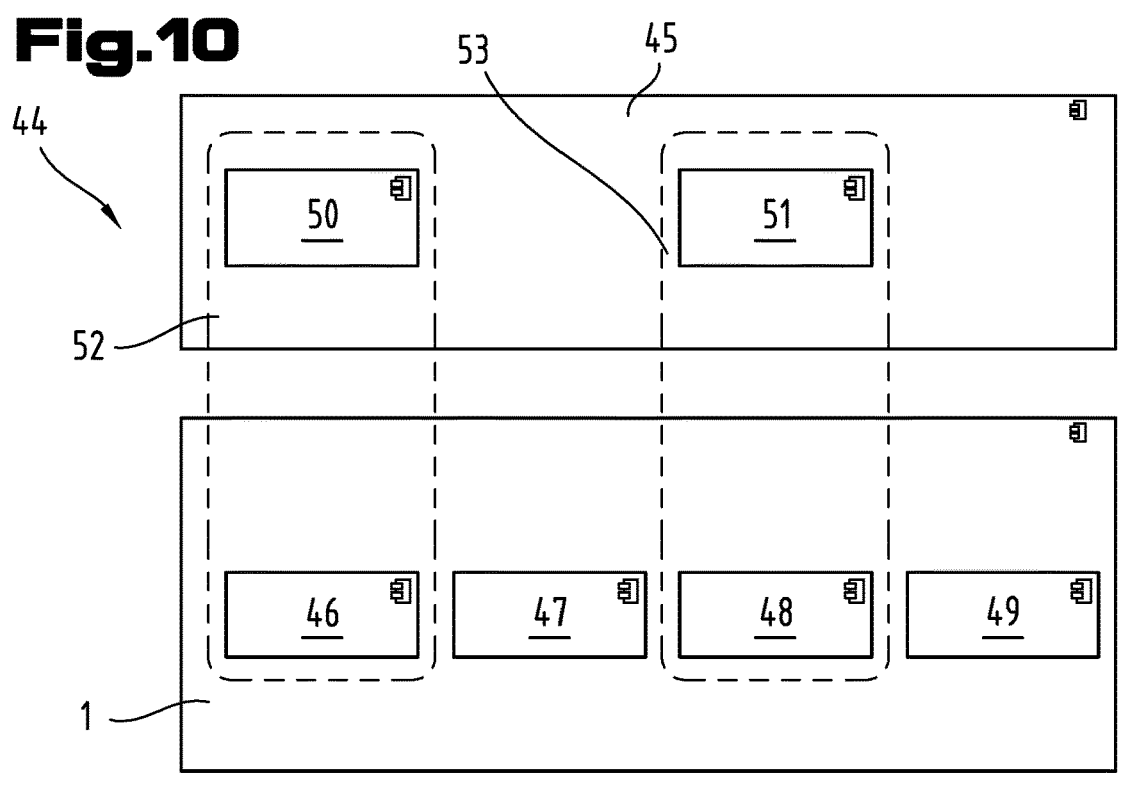
FIG. 10 a block diagram of an observation and image capturing system according to an embodiment.

The observation and image capturing system 44 shown in FIG. 10 comprises the telescope 1 with application programs 46, 47, 48, 49 installed thereon, and an external terminal 45, for example in the form of a smartphone. Part of the application programs 46, 47, 48, 49 installed on the telescope 1 can be accessed by the external terminal 45 via a connection and/or wireless connection, and vice versa.

Application programs 50 and 51 are also installed on the terminal 45 in this regard. The application programs 50, 51 installed on the terminal 45 interact with application programs 46 and 48 installed on the telescope 1. The application programs 50 and 46 as well as 51 and 48 in each case form a combined application program 52, 53. In this regard, parameters and/or functions of the application programs 46, 48 can be created or edited on the terminal 45 by means of the application programs 50, 51, wherein parameters and/or functions can be transferred from the terminal 45 to the telescope 1 and vice versa.

In the case of the observation and image capturing system 44, it is also additionally provided that programming interfaces (API) are provided for the access of the application programs 50, 51 of the external terminal 45 to the application programs 46, 47, 48, 49 of the telescope 1. In particular, a grouping of multiple programming interfaces for specific use cases may be provided. In addition, the transmission technology necessary for the specific use case of the telescope 1 for communication between the telescope 1 and the external terminal 45 can also be specified. The application program 50, 51 on the external terminal 45 also has a key which is used to control which set of programming interface group and associated transmission technology is allowed to access. Hence, it is provided that the communication is performed primarily via BLE (Bluetooth Low Energy) to thus save electricity. In a use case of an application program 50, 51 of the external terminal 45 for which WiFi is required, all communication is performed via WiFi and BLE is maintained only as a backup connection.

In particular, the observation and image capturing system 44 of the telescope 1 is configured to provide common functionalities towards the outside (towards the application programs 50, 51 of the external terminal 45). Namely, depending on the application program 46, 47, 48, 49 of the telescope 1 that has just been started, a corresponding functionality is provided and the application program 50, 51 of the external terminal 45 is notified thereof. The observation and image capturing system 44 of the telescope 1 also provides authorization management to the sets of programming interface group and associated transmission technology. Likewise, a corresponding connection management (WiFi or BLE) is performed.

Regarding the possibility that images can be stored in the memory 22 of the telescope 1 (FIG. 1), the controller 7 is programmed such that after successful transfer of an image to the external terminal 45, this image is automatically deleted from the memory 22. Separate intervention by the user is not required for this purpose. Thus, the memory 22 can be used very economically. In addition, it may also be provided that—if there is already a connection with the external terminal 45 during capturing—the image is automatically transferred to the latter. Incidentally, this functionality can also be provided for multiple clients simultaneously (multiple terminals 45).

Figure 11:
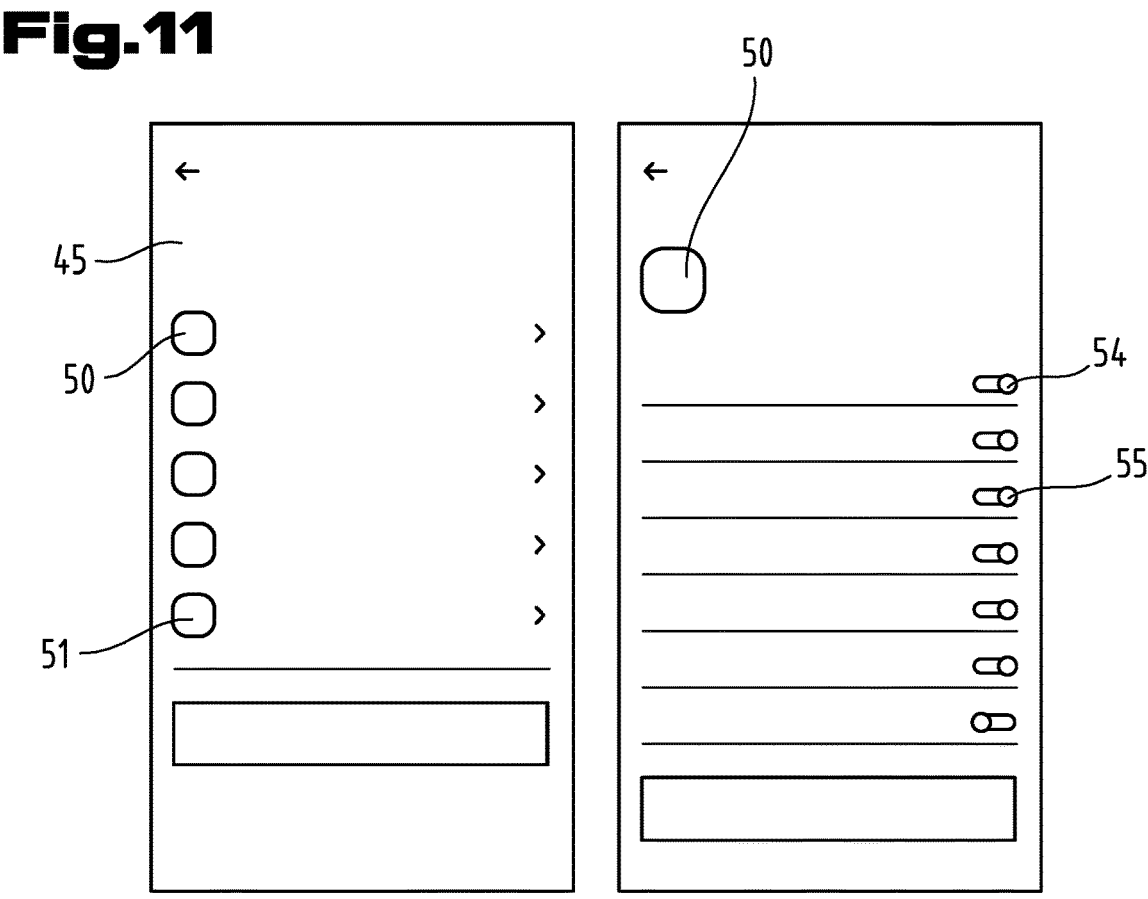
FIG. 11 a visual display on a terminal of the observation and image capturing system of FIG. 10.

In FIG. 11, a screen of the mobile terminal 45 is shown with multiple application programs 50, 51, which together with application programs 46, 47 installed on the telescope 1 form the combined application programs 52, 53. By calling up a submenu, parameters 54, 55 of one of the combined application programs 52, 53 can then be changed, for example.

Parameter selection and/or function settings can thereby, in an embodiment not shown in more detail, also be transmitted from a terminal 45 to a plurality of telescopes 1 and vice versa.

The function settings may be, for example, the switching on of the telescope 1, the switching off of the telescope 1, the coupling of the telescope 1 with the terminal 45, the downloading of captured images or videos from the telescope 1, the capturing of an image, the capturing of an image sequence or video, which are executed or started by the actuation of the actuator element, etc. The selection of a plurality of items from the group of parameters and functions can take place immediately one after the other. The program flow of a plurality of selected functions can be carried out essentially in parallel or displaced in time.

A first combined application program 52 may be a first mobile application providing the functions of live streaming, image management and importing updates for the firmware of the telescope 1. The live streaming is a real-time transmission of an image or video captured by means of the camera 4 to the paired terminal 45. In this regard, it is also possible that not just one single but multiple terminals are coupled such that multiple persons can look at the live stream at the same time.

A second combined application program 53 may be an identification application for birds. The type of bird can be recognized by means of an image database not described in further detail and an image recognition algorithm using an image of a bird captured by means of the camera 4, which is transmitted to the electronic terminal 45. Subsequently, the type of bird may be output on a display device of the electronic terminal 45. In this regard, it is conceivable that additional information such as a description of the type, a bird call and/or a representation of the geographic distribution are output on the mobile terminal 45.

However, such a program for bird recognition may also be an application program 47, 49 present only on the telescope 1, which functions autonomously and independently of the external terminal 45 and performs the bird recognition.

A third mobile application 51, 52, which can also be realized by means of a combined application program or by means of an autonomously functioning application program 47, 49 installed on the telescope, can be an identification application for mountains, wherein the names of the mountain peaks are output on the basis of a captured image of mountains.

By means of a fourth mobile application, which can be realized by means of a combined application program 50, 51, it is further conceivable that a captured image or an image sequence and/or a video is shared with a second operator, wherein a transmission to a second electronic terminal, which is not shown in more detail, takes place.

The application programs 50, 51 of the terminal 45 and the application programs 46, 47, 48, 49 of the telescope 1 can preferably also be installed by downloading from an external server.

Referring to FIG. 12, the telescope 1 has a mode selection wheel 56, preferably arranged on a user-side end face of the telescope 1, for calling up at least one function of the telescope 1. Different functions are called up in different positions of the mode selection wheel 56. The function whose icon is located at a defined reference position after turning the mode selection wheel is currently called up. Another function is called up by further turning the mode selection wheel 56. At least one position of the mode selection wheel 56 and/or one orientation of the mode selection wheel is provided for a function that can be freely selected by a user. For example, the user can access a program for assigning functions via the terminal 45 and assign a function preferred by the user to the freely assignable position of the mode selection wheel 56. In addition to defining settings, functions or other parameters and transmitting them from the terminal 45 to the telescope 1, it is also possible that all settings on the telescope 1 can be made without the aid of the terminal 45. The corresponding information can then be shown to the user on the display 5. A selection of the functions and programs can be made, for example, by means of an actuator element of the telescope 1. On the user-side end face of the telescope 1, adjacent to the mode selection wheel 56, a (colored) status LED 91 is arranged to indicate different operating modes of the telescope 1. This makes it possible for a user to recognize operating states even without looking through the viewing channels 2, 3.

Figure 13:
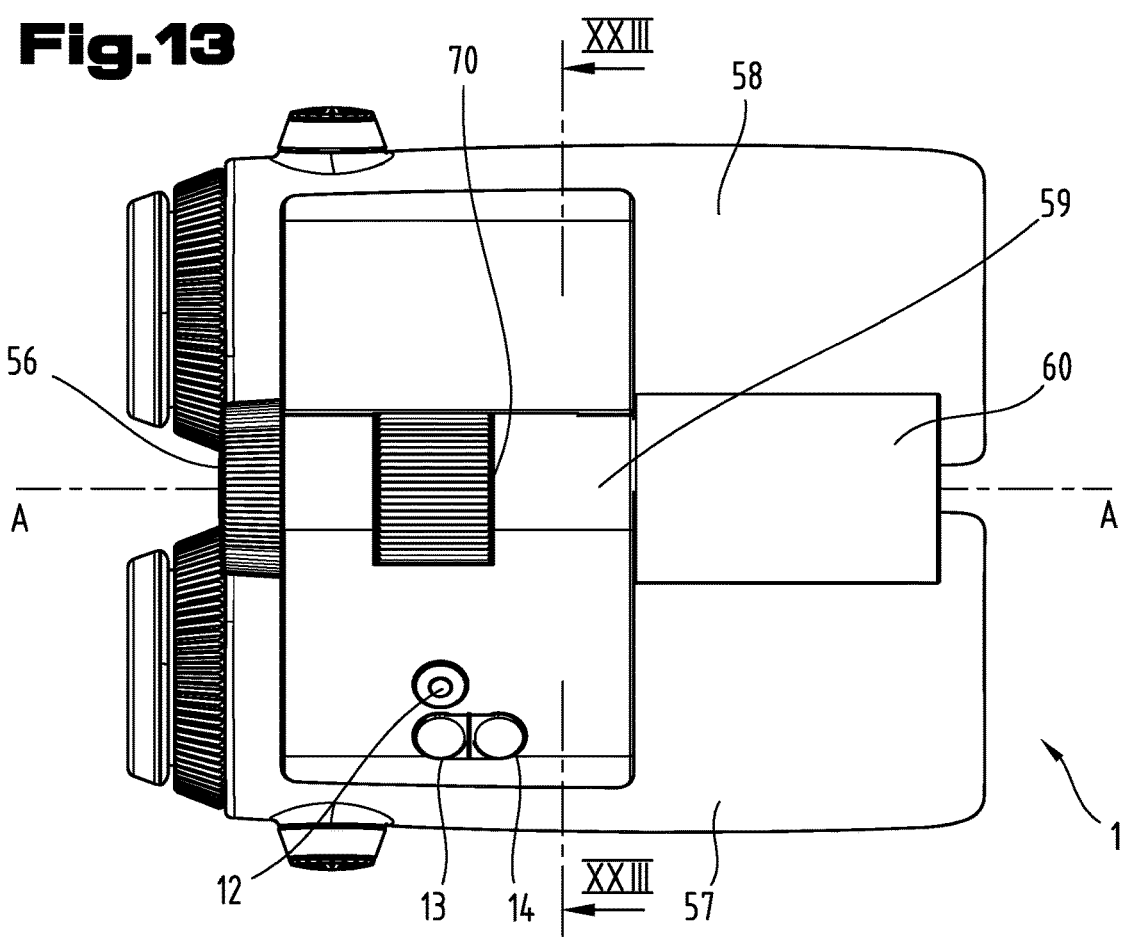
FIG. 13 a top view of the telescope of FIG. 12.

As can be seen from FIG. 13, the telescope 1 can be configured as a binocular. Having a first tube 57 and a second tube 58, wherein the first viewing channel, which is labeled 2 in FIG. 1, runs through the first tube 57 and the second viewing channel, which is labeled 3 in FIG. 1, runs through the second tube 58.

The two tubes 57, 58 are connected to each other by a hinged bridge 59. To adjust an interpupillary distance, the two tubes 57, 58 can be pivoted about a hinge axis of the hinged bridge 59.

Furthermore, a camera tube 60 containing the camera beam path is provided. In this regard, the camera tube 60 forms the hinge axis of the hinged bridge 59.

For focusing, the telescope 1 has a focusing ring 70. Advantageously, the center of gravity of the telescope 1 is located in the region of the focusing ring 70, whereby particularly good handling can be achieved.

Figure 14:
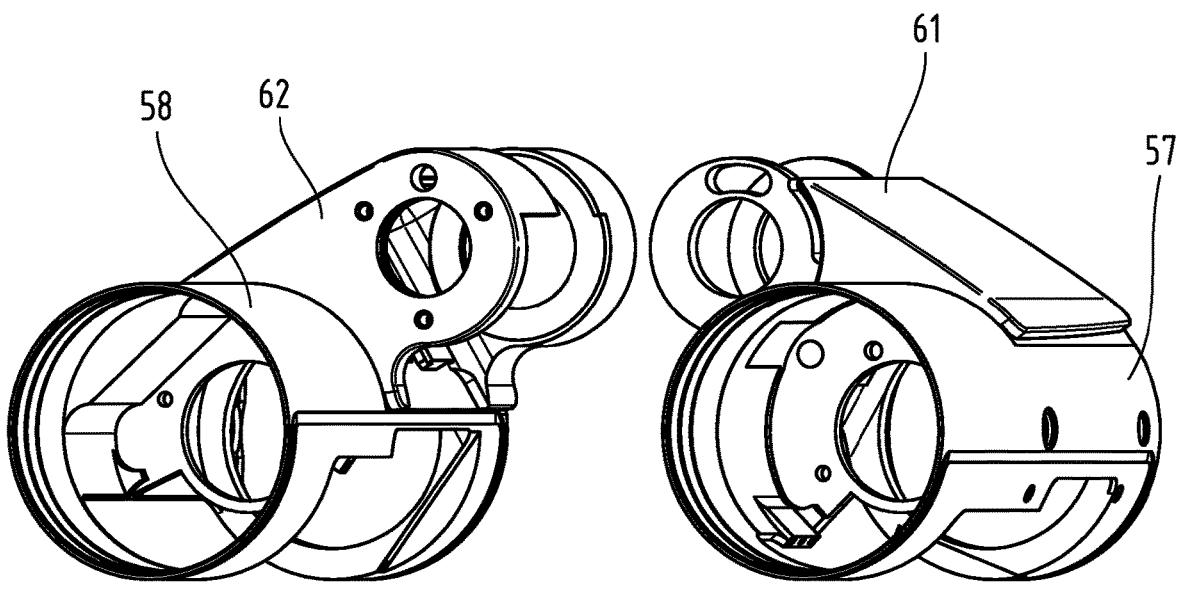
FIG. 14 a perspective view of two joint parts of a hinged bridge of the telescope of FIG. 12.

As can be seen from FIG. 14, the hinged bridge 59 has a first joint part 61, which is firmly connected to the first tube 57, and a second joint part 62, which is firmly connected to the second tube 58. The two joint parts 61 and 62 are connected to each other by the camera tube 60 shown in FIG. 15.

The first joint part 61 of the first tube 57 and the second joint part 62 of the second tube 58 abut a lateral surface of the camera tube 60. A geometric bend axis of the two tubes 57 and 58 extends within the camera tube 60. The bend axis and an optical axis of the camera beam path are arranged coaxially to one another.

The camera tube 60 is fixedly connected to the tube 57 and can be pivoted together with the tube 57. The display 5 is arranged in one of the two tubes 57, 58, preferably in the tube connected to the camera tube 60.

Figure 15:
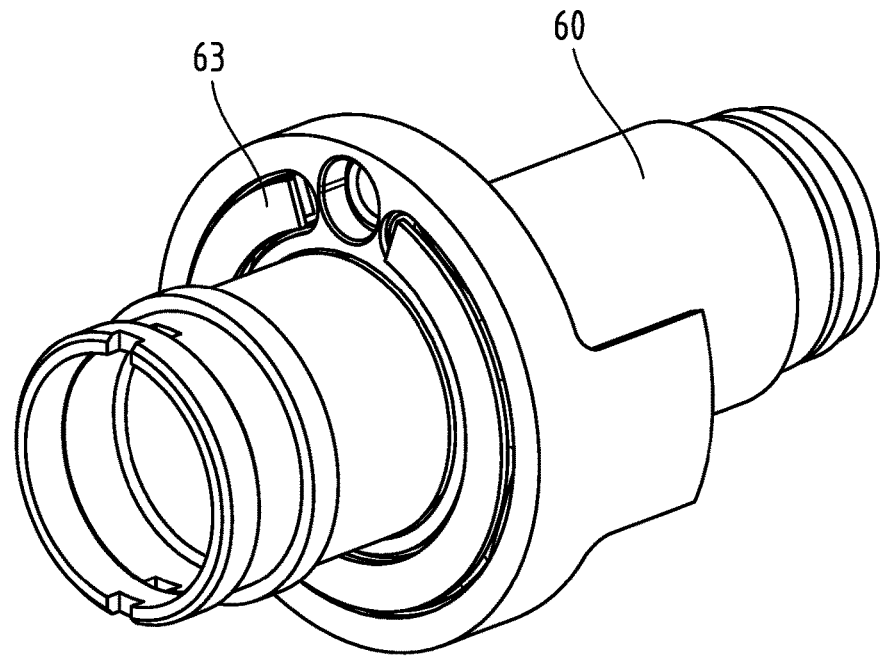
FIG. 15 a camera tube of the telescope of FIG. 12.
Figure 16:
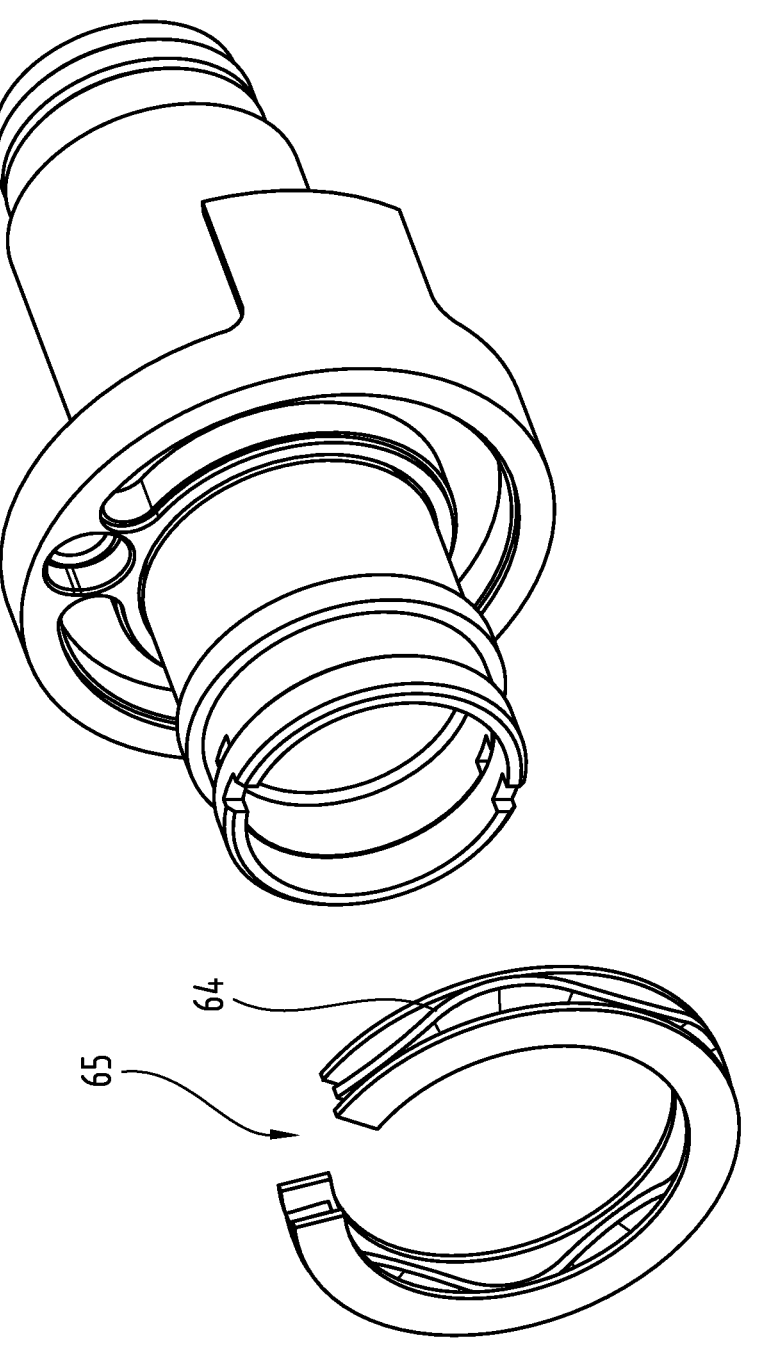
FIG. 16 the camera tube of FIG. 15 with the spring assembly removed.

To create a pivoting resistance between the first joint part 61 and the second joint part 62, the camera tube 60 may be formed with a spring arrangement 63, as shown in FIGS. 15 and 16. The spring arrangement 63 is disposed around the camera beam path and comprises a wave spring 64. The spring arrangement 63 has an opening 65 through which the push rod (reference number 67 in FIGS. 17 and 18) for moving a focusing lens (reference number 76 in FIG. 17) of the camera beam path extends. A portion of the spring arrangement 63 projecting in the direction of the objective from an element surrounding the camera tube 60 with a passage opening for the push rod, bears against a portion of the joint part 61 in an assembled state and generates a pivoting resistance when the two tubes 57, 58 are bent.

FIG. 17 shows the optical system of the camera channel. At this point, it should be noted that where, below, "lenses", such as an eyepiece lens, an objective lens or a focusing lens, are referred to and the term "lens" is used in the singular form, this is not to be understood in a limiting sense, but that a system of multiple lenses is or may be meant by that term. This is common practice in technical optics to avoid and/or compensate for imaging errors.

The camera channel has a cover glass 74 on the object side and, adjacent to the cover glass 74, an objective 75 and a focusing lens 76 as well as an eyepiece 77 and a camera module 78. The objective 75, the focusing lens 76 and the eyepiece 77 of the camera channel together form an afocal lens system. The camera module 78 is preferably formed as a unit with an electronic image capturing sensor, a separate objective, and with an integrated autofocus function. The focusing lens 77 can be moved by means of the push rod 67.

Figure 18:
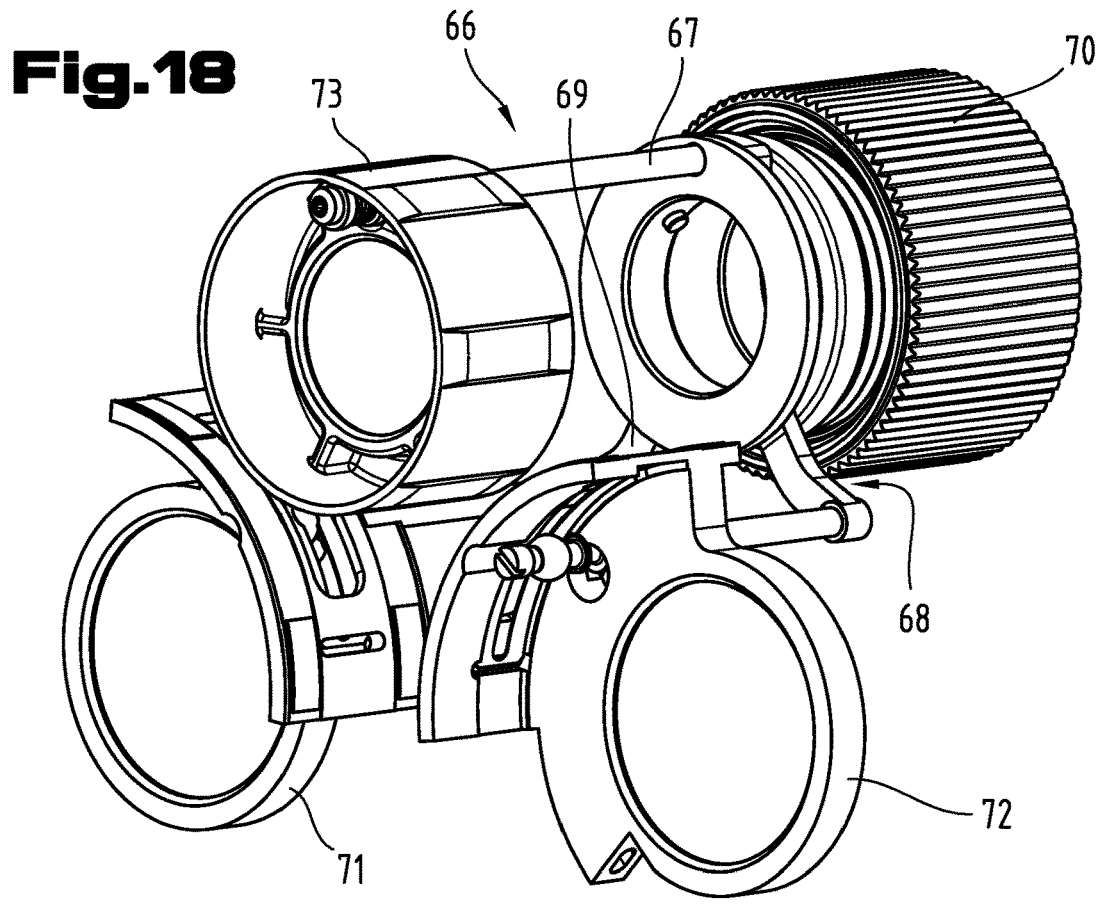
FIG. 18 an adjusting mechanism for focusing lenses of the telescope of FIG. 12.

FIG. 18 shows parts of the adjusting mechanism 66 for moving the focusing lenses of the camera beam path and the viewing beam paths 2, 3. The adjusting mechanism 66 has a push rod 67 and two drivers 68, 69 for moving the focusing lenses of the viewing channels 2, 3 and the focusing lens of the camera beam path together.

The push rod 67 of the adjusting mechanism 66 is coupled by means of the first driver 68 and the second driver 69 to corresponding movable lens mounts 71, 72, 73 of the viewing channel 2 or 3 and/or of the camera channel. Via corresponding control grooves (not shown), the focusing ring 70, when actuated, can act on the adjusting mechanism 66 such that the push rod 67 is moved in parallel to the optical axes of the viewing channels 2, 3 and the camera channel. By coupling to the push rod 67 by means of the drivers 68, 69, lastly, the focusing lenses of the viewing channels 2, 3 on the one hand and the focusing lens of the image capturing channel 3 on the other hand are moved in the axial direction. The focusing ring 70, the push rod 67 and the two drivers 68, 69 thus form a focusing device by means of which the focusing lens of the viewing channel 2, 3 and the focusing lens of the camera channel 3 can be moved together.

The common movement of the focusing lenses also causes an axial movement of the image planes of the distant object in the beam path of the camera channel at the same time. This movement of the image planes in the camera channel has the effect of a presetting and/or a rough adjustment of the image sharpness of the camera channel. A subsequent fine adjustment of the image sharpness is then effected by an autofocus function of the camera 4 and/or the camera module 78. For this purpose, the objective, which can be changed by the autofocus function of the camera module 78, is automatically adjusted such that a sharp image of the distant object is displayed on the light-sensitive sensor surface.

The automatically occurring focusing of the image in the camera channel with the autofocus function of the camera 4 and/or of the camera module 78 is preferably started immediately after actuation of the actuator element for triggering an image capturing. However, the initiation of the autofocus function of the camera 4 can alternatively also be triggered by the controller 7 in a program-controlled manner. For example, movements of the focusing lens can be monitored by the controller 7 with the aid of optionally provided sensors. Upon detection of one end of the movement of the focusing lens, the autofocus function can be triggered. Automatic triggering of the autofocus function after termination of manual focusing further has the advantage that when image/video recording is triggered by actuation of the operating button, new autofocusing can be omitted. Hence, the entire capturing operation is accelerated significantly, since the time between triggering and actual image recording is shortened recognizably.

In addition to setting focus of the optics of the telescope 1 by focusing, in the sense of mechanically positioning the optical elements relative to one another, as explained above in connection with the description of FIGS. 17 and 18, when capturing an image with the camera module 78 of the camera 4, the image quality and/or sharpness is also influenced by the state of movement of the telescope 1 at the time the image is captured.

In order to be able to obtain sharp images with a hand-held camera or binoculars with a camera, the exposure time must be kept as short as possible when taking still images. The focal lengths used with long-range optics further complicate this problem. For this purpose, there is the so-called reciprocal rule in the field of photography, which can be used to determine the freehand limit as an approximation: "The freehand limit states that when shooting with a focal length of 80 mm (miniature film equivalent), the shutter speed should be set to a maximum of $\frac{1}{80}$ seconds." For the optics of the telescope 1, this limit is about $\frac{1}{250}$ of a second. During twilight or when photographs of objects are to be taken under shady lighting conditions, such as at the edge of a forest or in a wood, longer exposure times are usually necessary. However, this so-called freehand limit is only a rough guide and the image quality is influenced by other factors, such as the camera resolution and/or the size of the pixels, the objective lens quality and the hand holding technique, i.e. how steady and stable the telescope 1 is held by the user during the exposure. The holding technique can vary greatly between novice and professional binocular users.

In the case where the telescope 1 does not have optical image stabilization, the holding technique is thus the most important influencing factor. In order to obtain the sharpest possible images, it is therefore essential to match the exposure time and hand tremor. For this purpose, for the telescope 1, the movement of the device is detected with an acceleration sensor and/or with the gyro sensor 19 (FIG. 1). The motion state of the device can thus be measured in the millisecond range as well as in the sub-millisecond range and, based on this, monitoring of the image capturing is performed. For this monitoring of the image capturing, a further application program is provided in the controller 7, which carries out the necessary evaluations of the sensor signals of the acceleration sensor and/or the gyro sensor 19. Based on the results of comparisons of the exposure time with limit values which indicate that images with sufficient sharpness can be expected, the user receives appropriate notices. These notices and/or warnings of the monitoring program for image capturing thus provide the user with assistance in their decision to trigger image capturing.

For the determination of the required image sharpness, it is assumed here that the amplitude of the movement caused by a hand tremor during the duration of the exposure should be below the linear expansion of two pixels of the image capturing sensor of the camera 4 (+/−1 pixel). In a preferred exemplary embodiment, with a focal length of the camera module 78 of 34.7 mm and a pixel size of 1.1 μm, this corresponds to 13.1" (angular seconds). The maximum exposure time when pivoting the binoculars, if one does not want to have motion blur due to pivoting, is then, for example, $\frac{1}{200}$ s with a pivoting motion during the exposure of 0.727°/s.

According to a first embodiment variant of the monitoring program for image capturing, when the actuator element for triggering image capturing is actuated, the instantaneous movement is detected (e.g. as a maximum from an elapsed interval of duration 1 s) and, based on this and on the desired image sharpness, the value of the maximum exposure time is calculated. The user is shown in the display by a symbol whether the exposure can be taken with sufficient exposure time. The user is shown a warning if the exposure time would not be sufficient.

In an alternative embodiment variant, an exposure time is specified and, when the shutter release is pressed, the achievable image sharpness is calculated based on the detected instantaneous movement. The user is shown in the display whether the image can be captured with the desired sharpness by displaying a symbol. The user is thus informed, for example, whether the captured image will be suitable for automatic object recognition. In addition, it may also be provided that by the monitoring program for image capturing in such a case, object recognition is prevented altogether.

In a further embodiment variant, it is provided that when the trigger is actuated, a series of images is captured in quick succession. The movements detected in each case during this time can then form the basis for storing, for example, only the image with the greatest sharpness; or the images are ranked according to the value of the achieved image sharpness. Alternatively, however, it may be provided that the motion state is checked after the shutter release button is pressed and the image is not captured until the movements are small enough for the selected exposure time. Such an option should be optional, since it can lead to undesirable delays. For this purpose, a maximum possible delay is preferably provided (e.g. 0.5 s). Especially the negative impact of hand tremor caused by pressing the release button could be avoided this way.

Figure 19:
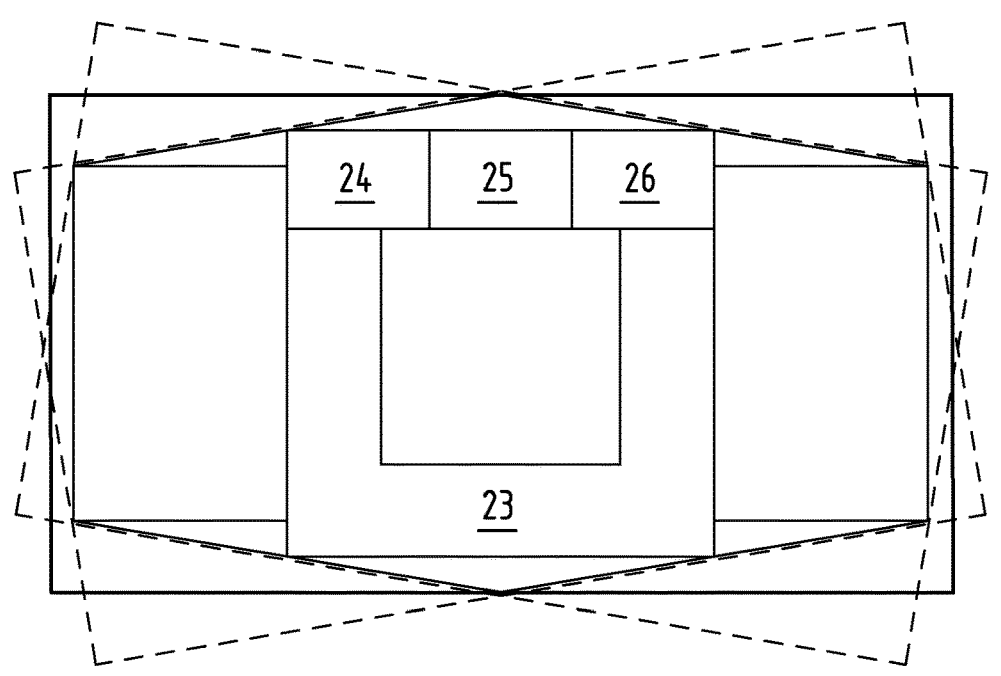
FIG. 19 a visual display on the display at different interpupillary distances of the telescope of FIG. 12.

According to FIG. 19, the telescope 1 is configured to detect a tilting angle of the tube with the overlayed display relative to the horizontal when an interpupillary distance is set by pivoting the first tube 57 and the second tube 58 against each other or by tilting the entire device slightly, and to carry out a position correction of information 23, 24, 25, 26 shown on the display 5 on the basis of the detected angle. For this purpose, the controller 7 can be configured to rotate a representation on the display on the basis of data received from an inclinometer for detecting the tilting angle in such a way that an upright representation is displayed for a user when looking through the viewing channel 2, 3 even if the interpupillary distance is changed or slight tilting occurs. In this regard, the tilting angle is determined as the reference tilting angle as the reference angle at a reference interpupillary distance, for example at a standard interpupillary distance of typically 68 mm, and at a horizontal orientation of the telescope. If the interpupillary distance changes relative to the reference interpupillary distance or if the telescope is tilted slightly relative to the horizontal, a differential tilting angle relative to the reference angle can be derived from this (differential tilting angle=difference between current tilting angle and reference angle) and the information shown on the display can be displayed horizontally in a specific tilt range, for example ±10° relative to the reference angle.

Figure 23:
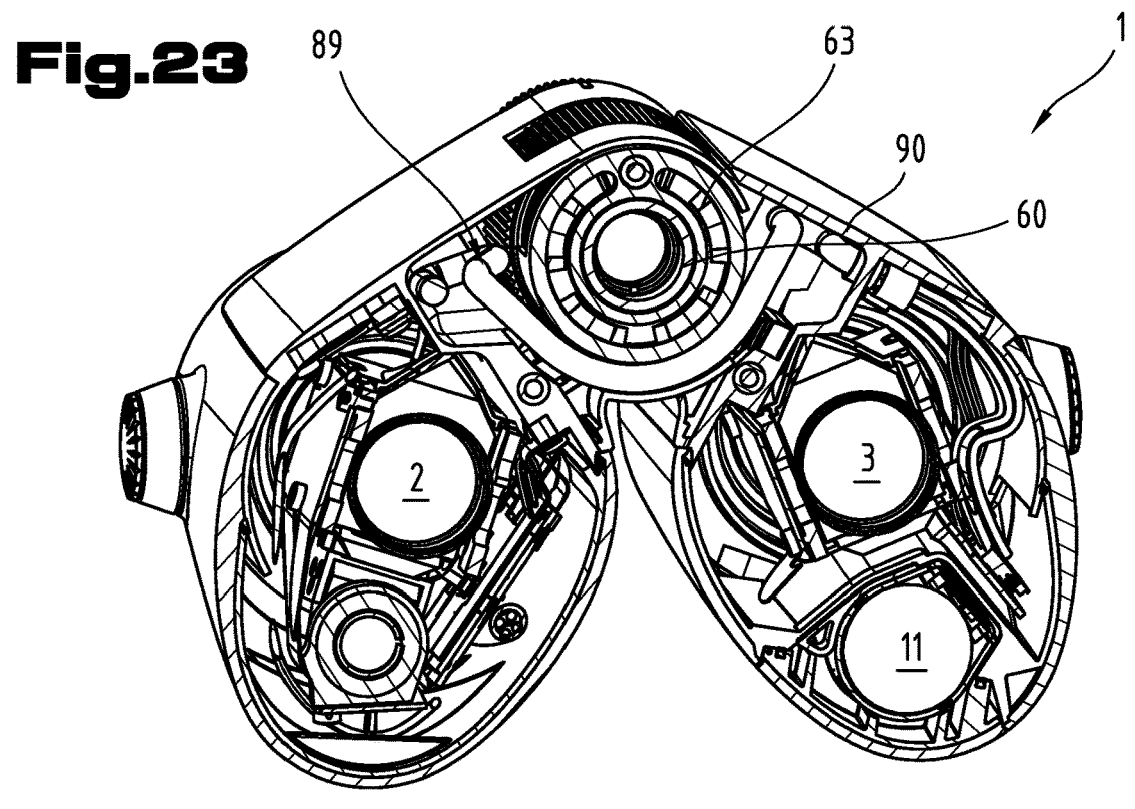
FIG. 23 a cross-section of the telescope according to FIGS. 12, 13, shown in perspective.
Figure 24:
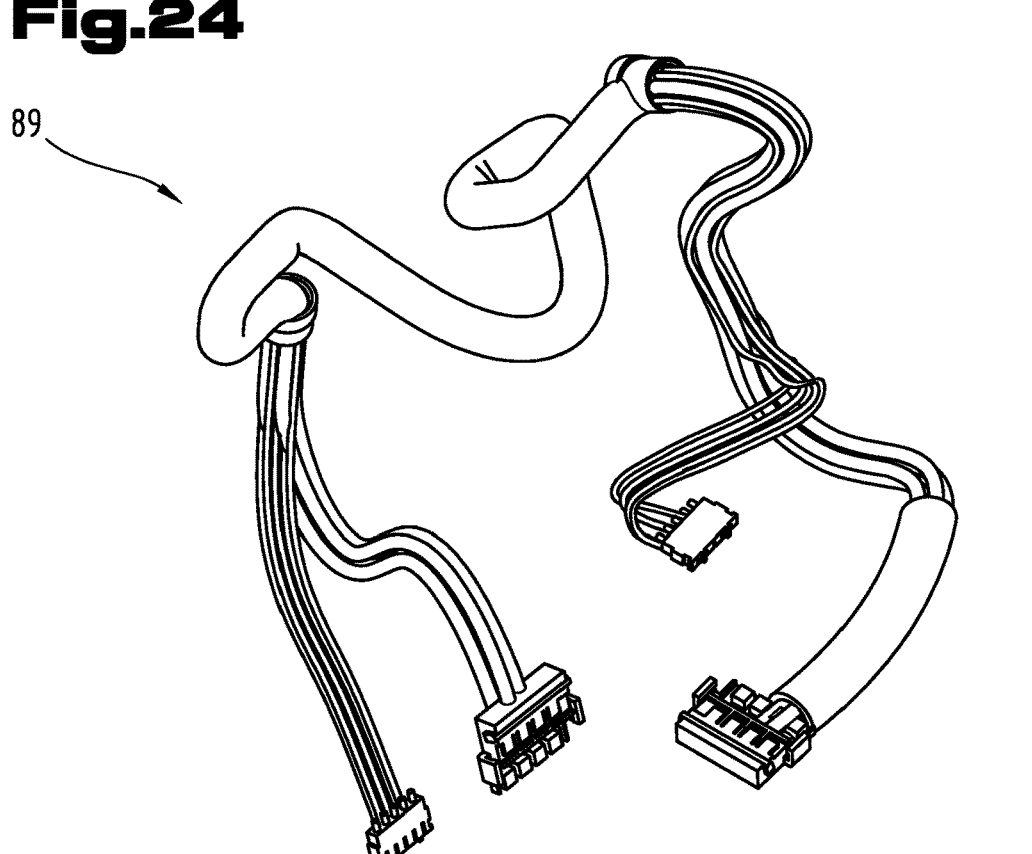
FIG. 24 a detail of the internal line connection of the telescope.

With reference to FIGS. 23 and 24, details of the wire connection between the two housing parts of the two viewing channels 2, 3 of the telescope 1 will now be described.

FIG. 23 shows a cross-section of the telescope 1 according to FIGS. 12, 13, shown in perspective. In FIG. 24, a cable harness 89 is shown as a detail of the internal line connection of the telescope 1.

In the described telescope 1, comparatively high electrical powers are to be transmitted between the two housing parts. For space reasons, the energy storage 11 (battery) as the largest component is placed in the viewing channel 3 (left tube), while the main board (controller 7) as the second largest component is placed in the viewing channel 3 (right tube). A total of ten watts of power have to be transmitted. In addition to the current-carrying wires of the cable harness 89, five signal-transmitting wires are also used. In particular, the bending movement and, secondly, the central camera tube 60 must be taken into account in the construction. The camera tube 60 is an obstacle to the direct feed-through of the cable harness 89. The cable harness 89 is therefore arranged to run around the camera tube 60. For the available extent of a bending movement of the two housing parts, a change in length of the cable must also be taken into account and/or compensated for. In addition, sufficient sealing of the cable bushings in the two housing tubes must also be ensured.

Highly flexible wires are selected for the cable harness 89, and the sheathing of the conductors is made of an adhesive material. A cable channel 90 is formed in the intermediate space between the two housing parts surrounding the central camera tube 60, in which cable channel 90 a section of the cable harness 89 forming a loop can be stowed with minimal bending. In addition, the two current-carrying wires are divided into four wires to provide more flexibility. These now nine wires of the cable harness 89 are sheathed in the outer section by a thin highly flexible shrinking tube. The litz wires are fed into the two tubes through sealing sleeves. For this purpose, the litz wires are first sealed tightly in the sealing sleeves. These sealing sleeves are then inserted into the housing from the outside inwards with the cable and sealed tightly. The cable harness 89 is screwed into both tubes and thus strain-relieved. As thermal protection for a section of the cable harness 89 running above an IC, it is protected against high temperatures (>80° C.) by a braided sleeve.

The invention claimed is:

1. A telescope having at least one viewing channel, the telescope comprising: at least one camera, wherein the telescope is configured to calculate, upon actuation of an actuator element based on a detected instantaneous movement of the telescope, an achievable image sharpness for an image to be captured with the camera and to indicate to the user whether the image can be taken with the desired image sharpness and/or to indicate to the user whether the achievable image sharpness is suitable for automatic object recognition.

2. The telescope according to claim 1, further comprising: at least one display visible in the at least one viewing channel, in particular overlayed, particularly preferred reflected, in the at least one viewing channel.

3. The telescope according to claim 2, characterized in that it is configured to recognize objects in images captured by the camera.

4. The telescope according to claim 3, characterized in that it is configured to generate a virtual marking frame and to represent it on the display, wherein the telescope is further configured to recognize at least one object represented within the marking frame of the display.

5. The telescope according to claim 1, characterized in that it has at least one memory with user-specific and/or topic-specific and/or location-specific information, in particular information on locally occurring animal species and/or field names and/or mountain names and/or POIs and/or that the telescope has a data interface for data exchange with at least one external memory with user-specific and/or topic-specific and/or location-specific information, in particular information on locally occurring animal species and/or field names and/or mountain names and/or POIs.

6. The telescope according to claim 1, further comprising: at least one camera focusing lens and at least one focusing lens arranged in the viewing channel, wherein the telescope is configured to determine a relative position of an image center of a camera image relative to an image center of an image displayed in the at least one viewing channel based on a movement of the focusing lenses.

7. The telescope according to claim 1, further comprising: a mode selection wheel, preferably arranged on a user-side end face of the telescope, for calling up at least one function of the telescope, wherein different functions are called up in different positions of the mode selection wheel.

8. The telescope according to claim 7, characterized in that at least one position of the mode selection wheel can be assigned a function that can be selected by a user.

9. The telescope according to claim 1, characterized in that it is a binocular with a first tube and with a second tube, wherein a first viewing channel extends through the first tube and a second viewing channel extends through the second tube, wherein the two tubes are connected to each other by a hinged bridge,
   wherein the two tubes are pivotable about a hinge axis of the hinged bridge to adjust an interpupillary distance,
   and wherein the camera has a camera beam path,
   wherein the hinge axis and an optical axis of the camera beam path are arranged coaxially to each other,
   and wherein a camera tube containing the camera beam path forms the hinge axis of the hinged bridge.

10. An observation and image capturing system, comprising: at least one telescope according to claim 1 and at least one electronic terminal, wherein the at least one telescope and the at least one electronic terminal are coupled to one another via a connection at least temporarily.

* * * * *